(12) United States Patent
Wenren et al.

(10) Patent No.: US 10,976,519 B2
(45) Date of Patent: Apr. 13, 2021

(54) OPTICAL IMAGING LENS ASSEMBLY

(71) Applicant: ZHEJIANG SUNNY OPTICAL CO., LTD., Ningbo (CN)

(72) Inventors: Jianke Wenren, Ningbo (CN); Lin Yang, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 190 days.

(21) Appl. No.: 16/226,257

(22) Filed: Dec. 19, 2018

(65) Prior Publication Data

US 2019/0121065 A1 Apr. 25, 2019

Related U.S. Application Data

(63) Continuation of application No. PCT/CN2018/074544, filed on Jan. 30, 2018.

(30) Foreign Application Priority Data

Jul. 6, 2017 (CN) .......................... 201710546349.9
Jul. 6, 2017 (CN) .......................... 201720811693.1

(51) Int. Cl.
*G02B 9/64* (2006.01)
*G02B 27/00* (2006.01)
*G02B 7/04* (2021.01)
*G02B 13/00* (2006.01)

(52) U.S. Cl.
CPC .................. *G02B 9/64* (2013.01); *G02B 7/04* (2013.01); *G02B 13/0045* (2013.01); *G02B 27/0025* (2013.01)

(58) Field of Classification Search
None
See application file for complete search history.

(56) References Cited

U.S. PATENT DOCUMENTS 9,523,841 B1* 12/2016 Chen ...................... G02B 5/208
2012/0099210 A1 4/2012 Huang et al.
(Continued)

FOREIGN PATENT DOCUMENTS

CN 1924632 A 3/2007
CN 102455483 A 5/2012
(Continued)

OTHER PUBLICATIONS

International Search Report for Application No. PCT/CN2018/074544, dated Apr. 28, 2018, 11 pages.

*Primary Examiner* — Darryl J Collins
(74) *Attorney, Agent, or Firm* — Barnes & Thornburg LLP

(57) ABSTRACT

The present disclosure discloses an optical imaging lens assembly. The optical imaging lens assembly sequentially includes a first lens, a second lens, a third lens, a fourth lens, a fifth lens, a sixth lens, and a seventh lens from an object side to an image side along an optical axis. Each of the first lens, the fourth lens, and the fifth lens has a positive refractive power or a negative refractive power. The second lens has a positive refractive power, and the third lens has a negative refractive power. At least one of the sixth lens and the seventh lens has a negative refractive power. An effective focal length f1 of the first lens and an effective focal length f2 of the second lens satisfy: $f2/|f1|<0.5$.

18 Claims, 15 Drawing Sheets

(56) References Cited

U.S. PATENT DOCUMENTS

| | | | |
|---|---|---|---|
| 2014/0043694 A1* | 2/2014 | Tsai | G02B 9/64 |
| | | | 359/708 |
| 2016/0085058 A1 | 3/2016 | Chae | |
| 2016/0139372 A1 | 5/2016 | Tanaka | |
| 2016/0370560 A1 | 12/2016 | Kubota et al. | |
| 2016/0377841 A1 | 12/2016 | Kubota et al. | |

FOREIGN PATENT DOCUMENTS

| | | |
|---|---|---|
| CN | 204065539 U | 12/2014 |
| CN | 104950424 A | 9/2015 |
| CN | 105829942 A | 8/2016 |
| CN | 107102425 A | 8/2017 |
| CN | 206930824 U | 1/2018 |

\* cited by examiner

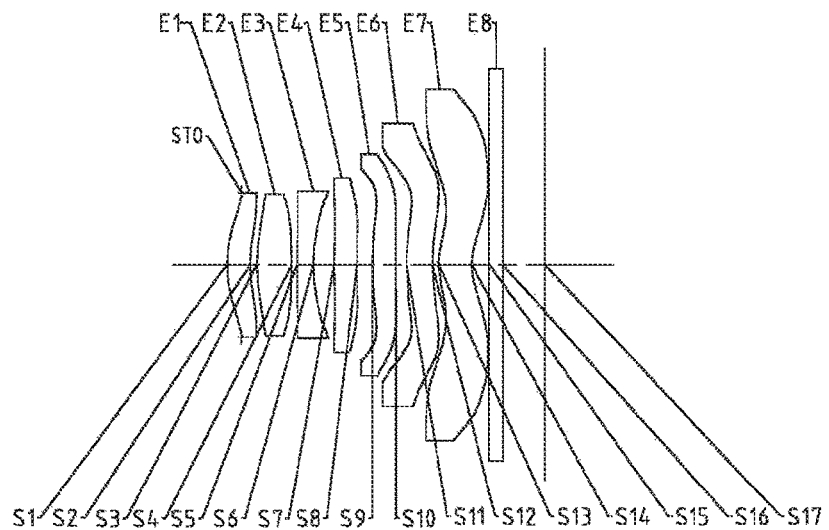
Fig. 5
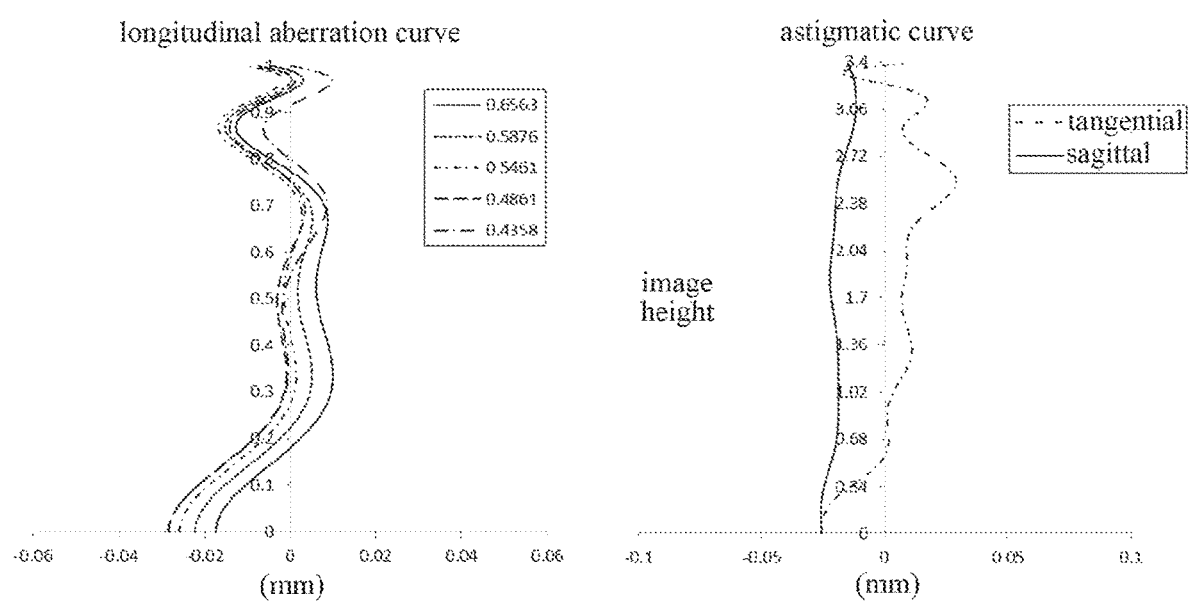
Fig. 6A
Fig. 6B

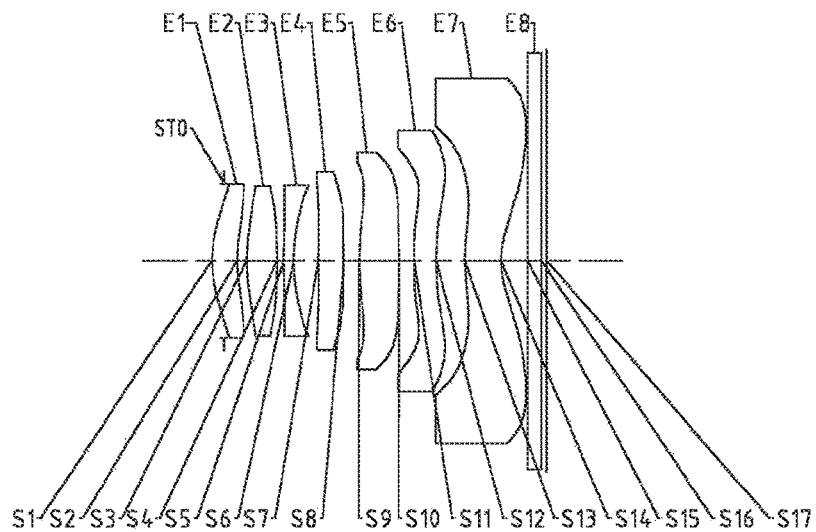
Fig. 9
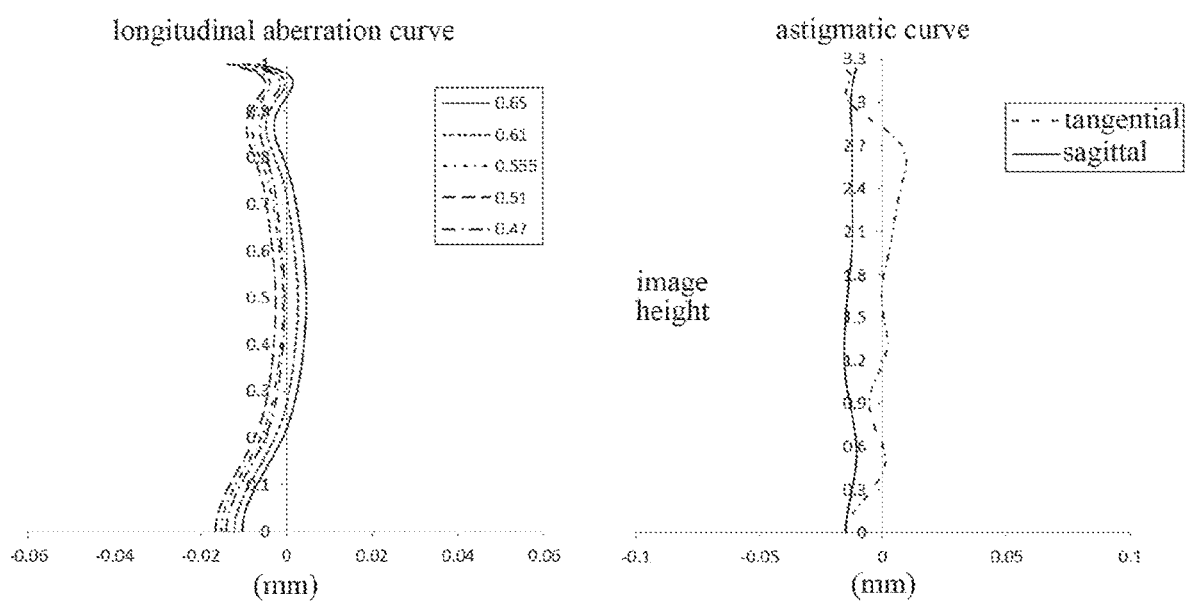
Fig. 10A
Fig. 10B

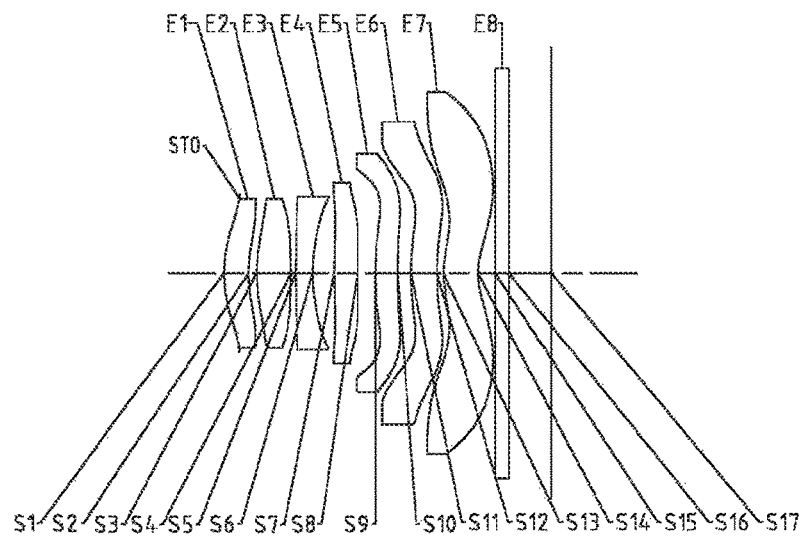
Fig. 13
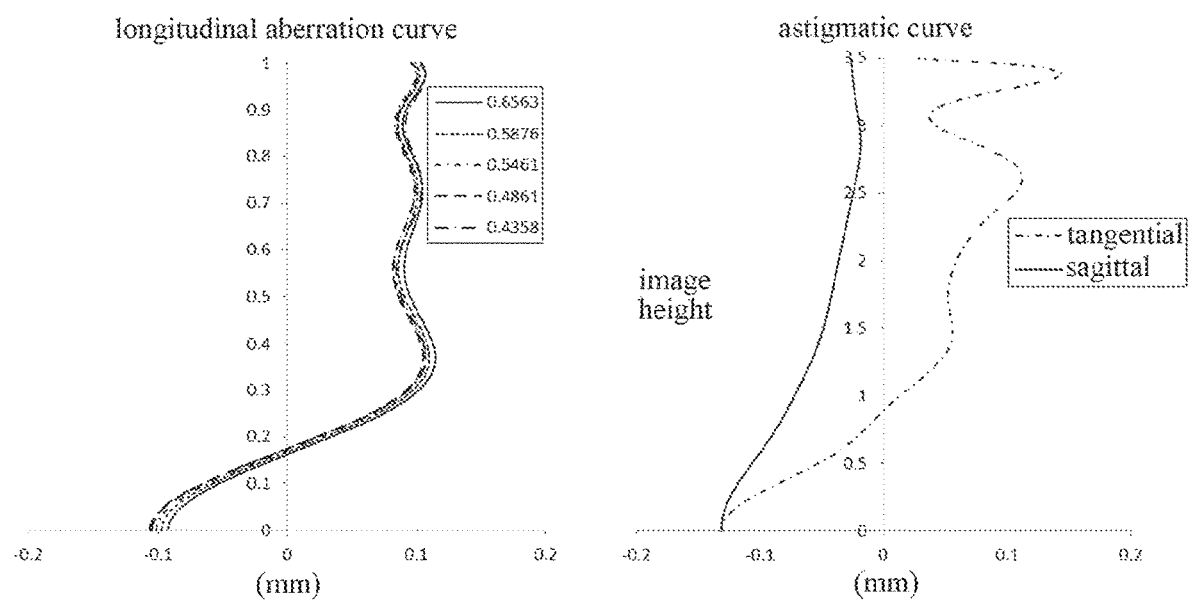
Fig. 14A
Fig. 14B

OPTICAL IMAGING LENS ASSEMBLY

CROSS-REFERENCE TO RELATED APPLICATIONS

This application is a continuation of International Application No. PCT/CN2018/074544, filed on Jan. 30, 2018, which claims the priorities and rights to Chinese Patent Application No. 201710546349.9 and Chinese Patent Application No. 201720811693.1 filed with the China National Intellectual Property Administration (CNIPA) on Jul. 6, 2017. All of the aforementioned applications are hereby incorporated by reference in their entireties.

TECHNICAL FIELD

The present disclosure relates to an optical imaging lens assembly, and more specifically to an optical imaging lens assembly including seven lenses.

BACKGROUND

As science and technology develop, portable electronic products are gradually emerging. In particular, portable electronic products having camera functions are increasingly favored by the consumers. In recent years, with the performance improvement and size reduction of the commonly used photosensitive elements such as charge-coupled devices (CCD) or complementary metal-oxide semiconductor elements (CMOS), higher requirements on high imaging quality and miniaturization of the counterpart optical imaging lens assemblies have been brought forward, thereby increasing the difficulty in designing the lens assemblies.

In order to satisfy the miniaturization, the conventional means is to reduce the number of lenses in the optical imaging lens assembly as much as possible. However, the reduction of the number of the lenses may casue the lack of freedom in designing the lens assembly, making it difficult for the lens to meet the market demands for high imaging performances.

SUMMARY

The present disclosure provides an optical imaging lens assembly which may be applicable to portable electronic products and may at least or partially sovle at least one of the above disadvantages in the existing technology.

According to an aspect, the present disclosure provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. Each of the first lens, the fourth lens, and the fifth lens has a positive refractive power or a negative refractive power. The second lens may have a positive refractive power, and the third lens may have a negative refractive power. At least one of the sixth lens or the seventh lens may have a negative refractive power. An effective focal length f1 of the first lens and an effective focal length f2 of the second lens may satisfy: $f2/|f1|<0.5$.

In an implementation, a total effective focal length f of the optical imaging lens assembly and an effective focal length f3 of the third lens may satisfy: $-1.0<f/f3\leq-0.5$.

In an implementation, the total effective focal length f of the optical imaging lens assembly and an effective focal length f4 of the fourth lens may satisfy: $f/|f4|\leq0.5$.

In an implementation, the total effective focal length f of the optical imaging lens assembly, an effective focal length f5 of the fifth lens, and an effective focal length f6 of the sixth lens may satisfy: $0.4\leq|f/f5|+|f/f6|\leq1.0$.

In an implementation, the total effective focal length f of the optical imaging lens assembly and an effective focal length f7 of the seventh lens satisfy: $f/|f7|<1.0$.

In an implementation, a center thickness CT4 of the fourth lens on the optical axis, a center thickness CT5 of the fifth lens on the optical axis and a center thickness CT6 of the sixth lens on the optical axis may satisfy: $(CT4+CT5+CT6)/3\leq0.5$.

In an implementation, an edge thickness ET4 of the fourth lens at a maximum radius and the center thickness CT4 of the fourth lens on the optical axis may satisfy: $0.4<=ET4/CT4<1.0$.

In an implementation, an object-side surface of the first lens may be a convex surface.

In an implementation, an image-side surface of the fourth lens may be a concave surface.

In an implementation, an image-side surface of the sixth lens may be a concave surface.

In an implementation, a radius of curvature R2 of an image-side surface of the first lens and a radius of curvature R3 of an object-side surface of the second lens may satisfy: $0.8\leq R2/R3\leq1.0$.

In an implementation, the radius of curvature R3 of the object-side surface of the second lens and a radius of curvature R4 of an image-side surface of the second lens may satisfy: $-0.5\leq R3/R4\leq0$.

In an implementation, a radius of curvature R6 of an image-side surface of the third lens and a radius of curvature R5 of an object-side surface of the third lens may satisfy: $0<R6/R5<0.5$.

In an implementation, a radius of curvature R7 of an object-side surface of the fourth lens and a radius of curvature R8 of the image-side surface of the fourth lens may satisfy: $0<R7/R8<1.5$.

In an implementation, a radius of curvature R9 of an object-side surface of the fifth lens and a radius of curvature R12 of the image-side surface of the sixth lens may satisfy: $|(R9-R12)/(R9+R12)|\leq2.0$.

In an implementation, a distance TTL on the optical axis from the object-side surface of the first lens to an image plane of the optical imaging lens assembly and half of a diagonal length ImgH of an effective pixel area of a photosensitive element on the image plane of the optical imaging lens assembly may satisfy: $TTL/ImgH\leq1.85$.

According to an aspect, the present disclosure provides an optical imaging lens assembly. The optical imaging lens assembly includes, sequentially along an optical axis from an object side to an image side, a first lens, a second lens, a third lens, a fourth lens, a fifth lens, a sixth lens, and at least one subsequent lens. At least one of the first lens, the fourth lens, or the fifth lens may have a positive refractive power. The second lens has a positive refractive power, and the third lens has a negative refractive power. The sixth lens has a positive refractive power or a negative refractive power. A center thickness CT4 of the fourth lens on the optical axis, a center thickness CT5 of the fifth lens on the optical axis and a center thickness CT6 of the sixth lens on the optical axis may satisfy: $(CT4+CT5+CT6)/3\leq0.5$.

In an implementation, a distance TTL on the optical axis from an object-side surface of the first lens to an image plane of the optical imaging lens assembly and half of a diagonal length ImgH of an effective pixel area of a photosensitive element on the image plane of the optical imaging lens assembly may satisfy: TTL/ImgH≤1.85.

In an implementation, an effective focal length f1 of the first lens and an effective focal length f2 of the second lens may satisfy: f2/|f1|<0.5.

In an implementation, a total effective focal length f of the optical imaging lens assembly and an effective focal length f3 of the third lens may satisfy: −1.0<f/f3≤−0.5.

In an implementation, the total effective focal length f of the optical imaging lens assembly and an effective focal length f4 of the fourth lens may satisfy: f/|f4|≤0.5.

In an implementation, the total effective focal length f of the optical imaging lens assembly, an effective focal length f5 of the fifth lens, and an effective focal length f6 of the sixth lens may satisfy: 0.4≤|f/f5|+|f/f6|≤1.0.

In an implementation, a radius of curvature R2 of an image-side surface of the first lens and a radius of curvature R3 of an object-side surface of the second lens may satisfy: 0.8≤R2/R3≤1.0.

In an implementation, the radius of curvature R3 of the object-side surface of the second lens and a radius of curvature R4 of an image-side surface of the second lens may satisfy: −0.5≤R3/R4≤0.

In an implementation, a radius of curvature R6 of an image-side surface of the third lens and a radius of curvature R5 of an object-side surface of the third lens may satisfy: 0<R6/R5<0.5.

In an implementation, an image-side surface of the fourth lens may be a concave surface. A radius of curvature R7 of an object-side surface of the fourth lens and a radius of curvature R8 of the image-side surface of the fourth lens may satisfy: 0<R7/R8<1.5.

In an implementation, an edge thickness ET4 of the fourth lens at a maximum radius and the center thickness CT4 of the fourth lens on the optical axis may satisfy: 0.4<ET4/CT4<1.0.

In an implementation, an image-side surface of the sixth lens may be a concave surface. A radius of curvature R9 of an object-side surface of the fifth lens and a radius of curvature 81.2 of the image-side surface of the sixth lens may satisfy: |(R9−R12)/(R9+R12)|≤2.0.

In an implementation, the at least one subsequent lens includes a seventh lens having a positive refractive power or a negative refractive power. An effective focal length f7 of the seventh lens and the total effective focal length f of the optical imaging lens assembly may satisfy: f/|f7|<1.0.

According to another aspect, the present disclosure further provides an optical imaging lens assembly. The optical imaging lens assembly includes, sequentially along an optical axis from an object side to an image side, a first lens, a second lens, a third lens, a fourth a fifth lens, a sixth lens, and a seventh lens. An object-side surface of the first lens is a convex surface. A radius of curvature R3 of an object-side surface of the second lens and a radius of curvature R4 of an image-side surface of the second lens may satisfy: −0.5≤R3/R4≤0. A radius of curvature R5 of an object-side surface of the third lens and a radius of curvature R6 of an image-side surface of the third lens may satisfy: 0<R6/R5<0.5. An image-side surface of the fourth lens and an image-side surface of the six lens may both be concave surfaces. At least one of an object-side surface or an image-side surface of the fifth lens may be a convex surface. At least one of an object-side surface or an image-side surface of the seventh lens may be a concave surface.

In an implementation, a radius of curvature R7 of an object-side surface of the fourth lens and a radius of curvature R8 of the image-side surface of the fourth lens may satisfy: 0<R7/R8<1.5.

In an implementation, a radius of curvature R9 of the object-side surface of the fifth lens and a radius of curvature R12 of the image-side surface of the sixth lens may satisfy: |(R9−R12)/(R9+R12)|≤2.0.

In an implementation, the second lens may have a positive refractive power. An effective focal length f1 of the first lens and an effective focal length f2 of the second lens may satisfy: f2/|f1|<0.5.

In an implementation, the third lens may have a negative refractive power. A total effective focal length f of the optical imaging lens assembly and an effective focal length f3 of the third lens may satisfy: −1.0<f/f3≤−0.5.

In an implementation, at least one of the first lens, the fourth lens, or the fifth lens may have a positive refractive power.

In an implementation, the total effective focal length f of the optical imaging lens assembly and an effective focal length f4 of the fourth lens may satisfy: f/|f4|≤0.5.

In an implementation, at least one of the sixth lens or the seventh lens may have a negative refractive power.

In an implementation, the total effective focal length f of the optical imaging lens assembly, an effective focal length f5 of the fifth lens, and an effective focal length f6 of the sixth lens may satisfy: 0.4≤|f/f5|+|f/f6|≤1.0.

In an implementation, the total effective focal length f of the optical imaging lens assembly and an effective focal length f7 of the seventh lens may satisfy: f/|f7|<|<1.0.

In an implementation, an edge thickness ET4 of the fourth lens at a maximum radius and a center thickness CT4 of the fourth lens on the optical axis may satisfy: 0.4<ET4/CT4<1.0.

In an implementation, a distance TTL on the optical axis from the object-side surface of the first lens to an image plane of the optical imaging lens assembly and half of a diagonal length ImgH of an effective pixel area of a photosensitive element on the image plane of the optical imaging lens assembly may satisfy: TTL/ImgH≤1.85

In an implementation, the center thickness CT4 of the fourth lens on the optical axis, a center thickness CT5 of the fifth lens on the optical axis and a center thickness CT6 of the sixth lens on the optical axis may satisfy: (CT4+CT5+CT6)/3≤0.5.

According to another aspect, the present disclosure further provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. The first lens has a positive refractive power or a negative refractive power, and an object-side surface of the first lens is a convex surface. The second lens may have a positive refractive power, and the third lens may have a negative refractive power. The fourth lens has a positive refractive power or a negative refractive power, and an image-side surface of the fourth lens is a concave surface. The fifth lens has a positive refractive power or a negative refractive power. The sixth lens has a positive refractive power or a negative refractive power, and an image-side surface of the sixth lens is a concave surface. The seventh lens has a positive refractive power or a negative refractive power. A radius of curvature R9 of an object-side surface of the fifth lens and a radius of curvature R12 of the image-side surface of the sixth lens may satisfy: |(R9−R12)/(R9+R12)|≤2.0.

According to another aspect, the present disclosure further provides an optical imaging lens assembly. The optical imaging lens assembly includes, sequentially along an optical axis from an object side to an image side, a first lens, a second lens, a third lens, a fourth a fifth lens, a sixth lens, and a seventh lens. The first lens has a positive refractive power or a negative refractive power, and an object-side surface of the first lens is a convex surface. The second lens may have a positive refractive power. The third lens may have a negative refractive power. The fourth lens has a positive refractive power or a negative refractive power, and an image-side surface of the fourth lens is a concave surface. The fifth lens has a positive refractive power or a negative refractive power. The sixth lens has a positive refractive power or a negative refractive power, and an image-side surface of the sixth lens is a concave surface. The seventh lens has a positive refractive power or a negative refractive power. An edge thickness ET4 of the fourth lens at a maximum radius and a center thickness CT4 of the fourth lens on the optical axis may satisfy: $0.4<ET4/CT4<1.0$.

According to another aspect, the present disclosure further provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. The first lens has a positive refractive power or a negative refractive power, and an object-side surface of the first lens is a convex surface. The second lens may have a positive refractive power. The third lens may have a negative refractive power. The fourth lens has a positive refractive power or a negative refractive power, and an image-side surface of the fourth lens is a concave surface. The fifth lens has a positive refractive power or a negative refractive power. The sixth lens has a positive refractive power or a negative refractive power, and an image-side surface of the sixth lens is a concave surface. The seventh lens has a positive refractive power or a negative refractive power. A radius of curvature R2 of an image-side surface of the first lens and a radius of curvature R3 of an object-side surface of the second lens may satisfy: $0.8 \leq R2/R3 \leq 1.0$.

In the present disclosure, for example, seven lenses are used. By reasonably allocating the refractive powers and the surface types of the lenses, center thicknesses of the lenses on the optical axis, and the spacing distances on the optical axis between the lenses, etc., the optical imaging lens assembly possesses at least one of the following advantages:

shortening the total track length of the imaging system;
achiving miniaturization and ultra-thin characteristics of the lens assembly;
reducing the sensitivity of the system;
correcting various aberrations; and
improving the imaging quality of the lens assembly.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 5 is a schematic structural diagram illustrating an optical imaging lens assembly according to Embodiment 3 of the present disclosure;

FIGS. 6A-6D respectively illustrate a longitudinal aberration curve, an astigmatic curve, a distortion curve, and a lateral color curve of the optical imaging lens assembly according to Embodiment 3;

FIG. 9 is a schematic structural diagram illustrating an optical imaging lens assembly according to Embodiment 5 of the present disclosure;

FIGS. 10A-10D respectively illustrate a longitudinal aberration curve, an astigmatic curve, a distortion curve, and a lateral color curve of the optical imaging lens assembly according to Embodiment 5;

FIG. 13 is a schematic structural diagram illustrating an optical imaging lens assembly according to Embodiment 7 of the present disclosure;

FIGS. 14A-14D respectively illustrate a longitudinal aberration curve, an astigmatic curve, a distortion curve, and a lateral color curve of the optical imaging lens assembly according to Embodiment 7;

DETAILED DESCRIPTION

Figure 1:
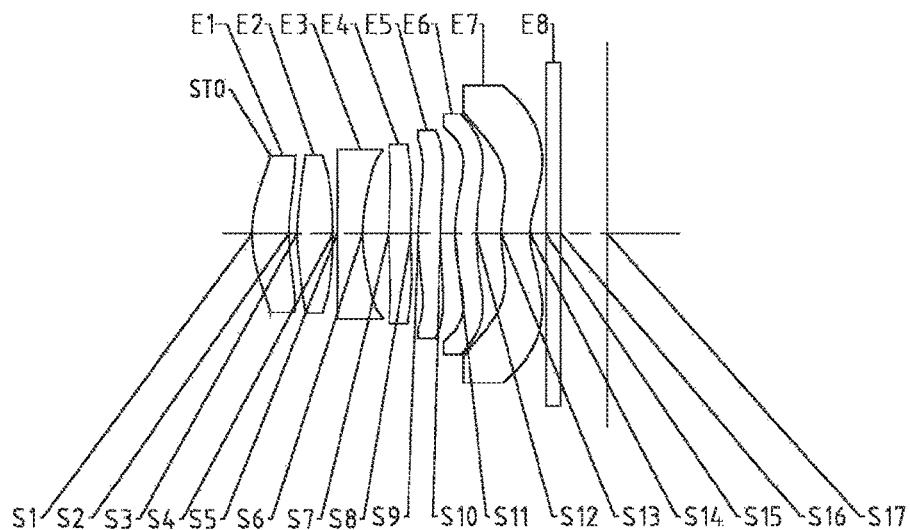
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area. If a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

An optical imaging lens assembly according to exemplary implementations of the present disclosure includes, for example, seven lenses, i.e., a first lens, a second lens, a third lens, a fourth lens, a fifth lens, a sixth lens, and a seventh lens, the seventh lenses having refractive powers. The seven lenses are arranged in sequence from an object side to an image side along an optical axis.

The optical imaging lens assembly according to the exemplary implementations of the present disclosure may further include a photosensitive element disposed on the image plane. Alternatively, the photosensitive element disposed on the image plane may be a photosensitive charge-coupled device (CCD) or complementary metal-oxide semiconductor (CMOS) element.

In the exemplary implementations, the first lens has a positive refractive power or a negative refractive power, an object-side surface of the first lens may be a convex surface, and an image-side surface of the first lens may be a concave surface. The second lens may have a positive refractive power, an object-side surface of the second lens may be a convex surface, and an image-side surface of the second lens may be a convex surface. The third lens may have a negative refractive power, an object-side surface of the third lens may be a convex surface, and an image-side surface of the third lens may be a concave surface. The fourth lens has a positive refractive power or a negative refractive power, an object-side surface of the fourth lens may be a convex surface, and an image-side surface of the fourth lens may be a concave surface. The fifth lens has a positive refractive power or a negative refractive power. The sixth lens has a positive refractive power or a negative refractive power, and an image-side surface of the sixth lens may be a concave surface. The seventh lens has a positive refractive power or a negative refractive power, an object-side surface of the seventh lens may be a convex surface, and an image-side surface of the seventh lens may be a concave surface.

An effective focal length f1 of the first lens and an effective focal length f2 of the second lens may satisfy: f2/|f1|<0.5, and more specifically, f1 and f2 may further satisfy: $0.04 \leq f2/|f1| \leq 0.39$. By reasonably configuring the effective focal length of the first lens and the effective focal length of the second lens, it helps to shorten the total track length of the optical system, and is conductive to correcting longitudinal chromatic aberratis at the same time.

An effective focal length f3 of the third lens and a total effective focal length f of the optical imaging lens assembly may satisfy: $-1.0 < f/f3 \leq -0.5$, and more specifically, f3 and f may further satisfy: $-0.82 \leq f/f3 \leq -0.54$. By reasonably configuring the total effective focal length f of the optical imaging lens assembly and the effective focal length f3 of the third lens, the variation of the refractive power of the lens group in the lens assembly may be balanced, thereby improving the imaging quality of the lens assembly.

An effective focal length f4 of the fourth lens and the total effective focal length f of the optical imaging lens may satisfy: $f/|f4| \leq 0.5$, and more specifically, f4 and f may further satisfy: $0.00 \leq f/|f| \leq 0.23$. By reasonably distributing the total effective focal length f of the optical imaging lens assembly and the effective focal length f4 of the fourth lens, the light deflection angle can be effectively reduced, and the sensitivity of the optical system can be effectively reduced.

An effective focal length f5 of the fifth lens, an effective focal length f6 of the sixth lens, and the total effective focal length f of the optical imaging lens assembly may satisfy: $0.41 \leq |f/f5| + |f/f6| \leq 1.0$, and more specifically, f5, f6 and f may further satisfy: $0.44 \leq |f/f5| + |f/f6| \leq 0.92$. By reasonably allocating the total effective focal length f of the optical imaging lens assembly, the effective focal length f5 of the fifth lens and the effective focal length f6 of the sixth lens, it helps to adjust the field curvature and astigmatism at the edge of the imaging assembly, thereby improving the imaging quality of the lens assembly.

An effective focal length f7 of the seventh lens and the total effective focal length f of the optical imaging lens assembly may satisfy: f/|f7|<1.0, and more specifically, f7 and f may further satisfy: $0.01 \leq f/|f7| \leq 0.85$. By reasonably allocating the total effective focal length f of the optical imaging lens assembly and the effective focal length f7 of the seventh lens, the light deflection angle can be effectively reduced and the sensitivity of the optical system can be effectively reduced.

In the application, a radius of curvature of a surface of each lens may be reasonably configured to achieve good optical characteristics.

A radius of curvature R2 of the image-side surface of the first lens and a radius of curvature R3 of the object-side surface of the second lens may satisfy: $0.8 \leq R2/R3 \leq 1.0$, and more specifically, R2 and R3 may further satisfy: $0.88 \leq R2/R3 \leq 0.95$. By reasonably controlling the radius of curvature of the image-side surface of the first lens and the radius of curvature of the object-side surface of the second lens, marginal rays may be better converged to reduce off-axis comatic aberrations, thereby improving the imaging quality of the lens assembly.

The second lens is a converging lens having a positive refractive power. The radius of curvature R3 of the object-side surface of the second lens and a radius of curvature R4 of the image-side surface of the second lens may satisfy: $-0.5 \leq R3/R4 \leq 0$, and more specifically, R3 and R4 may further satisfy: $-0.35 \leq R3/R4 \leq 0.10$. By reasonably controlling the radius of curvature of the object-side surface and the radius of curvature of the image-side surface of the second lens, light form the object side may be better converged, thereby reducing lateral chromatic aberrations of the system.

The third lens is a diverging lens having a negative refractive power. A radius of curvature R5 of the object-side surface of the third lens and a radius of curvature R6 of the image-side surface of the third lens may satisfy: $0<R6/R5<0.5$, and more specifically, R5 and R6 may further satisfy: $0.22 \leq R6/R5 \leq 0.33$. Under the premise that the image plane of the lens assembly satisfies the specifications, by reasonably controlling the radius of curvature of the image-side surface of the third lens and the radius of curvature of the object-side surface of the third lens, the light incident angle can be reasonably reduced, the sensitivity of the system can be reduced, and the assembly stability can be ensured.

A radius of curvature R7 of the object-side surface of the fourth lens and a radius of curvature R8 of the image-side surface of the fourth lens may satisfy: $0<R7/R8<1.5$, and more specifically, R7 and R8 may further satisfy: $0.32 \leq R7/R8 \leq 1.10$. By reasonably allocating the radius of curvature of the object-side surface and the radius of curvature of the image-side surface of the fourth lens, the system may obtain smaller lateral chromatic aberrations.

A radius of curvature R9 of an object-side surface of the fifth lens and a radius of curvature R12 of the image-side surface of the sixth lens may satisfy: $|(R9-R12)/(R9+R12)| \leq 2.0$, and more specifically, R9 and R12 may further satisfy: $0.071 \leq |(R9-R12)/(R9+R12)| \leq 1.60$. By reasonably controlling the radius of curvature of the object-side surface of the fifth lens and the radius of curvature of the image-side surface of the sixth lens, the system may obtain smaller longitudinal chromatic aberrations.

A center thickness CT4 of the fourth lens on the optical axis, a center thickness CT5 of the fifth lens on the optical axis and a center thickness CT6 of the sixth lens on the optical axis may satisfy: $(CT4+CT5+CT6)/3 \leq 0.5$, and more specifically, CT4, CT5 and CT6 may further satisfy: $0.30 \leq (CT4+CT5+CT6)/3 \leq 0.45$. By reasonably arranging the center thickness of the fourth lens, the center thickness of the fifth lens and the center thickness of the sixth lens, the fourth lens, it ensures that the fifth lens and the sixth lens possess more reasonable space utilization ratios and meet the assembly process requirements.

A total track length TTL of the optical imaging lens assembly (i.e., a distance on the optical axis from the object-side surface of the first lens to the image plane of the optical imaging lens assembly) and half of a diagonal length ImgH of an effective pixel area of the photosensitive element on the image plane of the optical imaging lens assembly may satisfy: $TTL/ImgH \leq 1.85$, and more specifically, III and ImgH may further satisfy: $1.371 \leq TTL/ImgH \leq 1.84$. By reasonably configuring TTL and ImgH, it is conductive to reducing aberrations in the edge field. Meanwhile, the size of the system can be effectively compressed to ensure the ultra-thin characteristics and miniaturization of the lens assembly.

In the exemplary implementations, the optical imaging lens assembly may further include at least one diaphragm as needed. For example, a diaphragm (e.g., an aperture diaphragm) for limiting light beams may be disposed between the object side and the first lens, to improve the imaging quality of the optical imaging lens assembly.

Alternatively, the optical imaging lens assembly may further include an optical filter for correcting color deviations and/or a protective glass for protecting the photosensitive element on the image plane.

By reasonably selecting the number of lenses in the lens assembly, for example, the seven lenses described in the above implementations, a good design freedom may be obtained, so as to better satisfy the market requirements on the high imaging performance of the lens assembly. By reasonably allocating the refractive power and the surface type of each lens, the center thickness of each lens, and the spacing distances on the axis between the lenses, etc., it is possible to shorten the total track length of the optical system, and ensure the miniaturization and the ultra-thin characteristics of the lens assembly. It is possible to correct the various aberrations, thereby improving the imaging quality of the lens assembly. Moreover, the sensitivity to processing and manufacturing errors may be reduced, thereby ensuring the assembly stabiligy.

In addition, as known by those skilled in the art, the aspheric lens has a better radius-of-curvature characteristic, and has advantages of improving a distortion aberration and an astigmatic aberration. In the implementations of the present disclosure, each lens having a refractive power may be an aspheric lens to eliminate as much as possible the aberrations that occur during the imaging, thereby further improving the imaging quality of the optical imaging system. The use of the aspheric lens may not only improve the imaging quality and reduce the aberrations significantly, but may also reduce the number of lenses in the lens assembly and reduce the size of the lens assembly.

It should also be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to include seven lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes, sequentially along an optical axis from an object side to an image side, a first lens E1, a second lens E2, a third lens E3, a fourth lens E4, a fifth lens E5, a sixth lens E6, a seventh lens S17, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens S14 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the imaging quality of the optical imaging lens assembly.

Table 1 shows the surface type, the radius of curvature, the thickness, the material and the conic coefficient of each lens in the optical imaging lens assembly in Embodiment 1. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2562 | | | |
| S1 | aspheric | 1.9200 | 0.5125 | 1.55 | 56.1 | −13.2467 |
| S2 | aspheric | 2.4565 | 0.1136 | | | −16.6966 |
| S3 | aspheric | 2.6769 | 0.5023 | 1.55 | 56.1 | −15.9894 |
| S4 | aspheric | −7.7388 | 0.0597 | | | −3.8063 |
| S5 | aspheric | 11.6022 | 0.3564 | 1.67 | 20.4 | 60.8975 |
| S6 | aspheric | 2.5649 | 0.3658 | | | −21.1573 |
| S7 | aspheric | 7.9941 | 0.3109 | 1.65 | 23.5 | −55.3305 |
| S8 | aspheric | 7.4126 | 0.1024 | | | 7.2462 |
| S9 | aspheric | 3.8549 | 0.3050 | 1.55 | 56.1 | −19.1350 |
| S10 | aspheric | 5.7096 | 0.2171 | | | −69.5573 |
| S11 | aspheric | 2.6512 | 0.2960 | 1.65 | 23.5 | −26.2515 |
| S12 | aspheric | 3.3256 | 0.3470 | | | −45.7656 |
| S13 | aspheric | 1.6160 | 0.4066 | 1.55 | 56.1 | −8.4429 |
| S14 | aspheric | 1.0976 | 0.2201 | | | −4.2975 |
| S15 | spherical | infinite | 0.2100 | 1.52 | 64.2 | |
| S16 | spherical | infinite | 0.6446 | | | |
| S17 | spherical | infinite | | | | |

As may be obtained from Table 1, the radius of curvature R2 of the image-side surface S2 of the first lens E1 and the radius of curvature R3 of the object-side surface S3 of the second lens E2 satisfy: R2/=0.92. The radius of curvature R3 of the object-side surface S3 of the second lens E2 and the radius of curvature R4 of the image-side surface S4 of the second lens E2 satisfy: R3/R4=−0.35. The radius of curvature R5 of the object-side surface S5 of the third lens E3 and the radius of curvature R6 of the image-side surface S6 of the third lens E3 satisfy: R6/R5=0.22. The radius of curvature R7 of the object-side surface S7 of the fourth lens E4 and the radius of curvature R8 of the image-side surface S8 of the fourth lens E4 satisfy: R7/R8=1.08. The radius of curvature R9 of the object-side surface S9 of the fifth lens E5 and the radius of curvature R12 of the image-side surface S12 of the sixth lens E6 satisfy: |(R9−R12)/(R9+R12)|=0.07. The center thickness CT4 of the fourth lens E4 on the optical axis, the center thickness CT5 of the fifth lens E5 on the optical axis, and the center thickness CT6 of the sixth lens E6 on the optical axis satisfy: (CT4+CT5+CT6)/3=0.30.

In this embodiment, an optical imaging lens assembly having seven lenses is used as an example. By reasonably allocating the focal lengths of the lenses, the surface types of the lenses, the center thicknesses of the lenses, and the spacing distances between the lenses, while the miniaturization of the imaging lens assembly is achieved, the sensitivity of the lens assembly is reduced and the imaging quality of the lens assembly is improved. In this embodiment, the surface type x of each aspheric surface is defined by the following formula:

$$x = \frac{ch^2}{1+\sqrt{1-(k+1)c^2h^2}} + \sum A_i h^i. \qquad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S14 in Embodiment 1.

TABLE 2

| surface number | A4 | A6 | A8 | A10 | A12 |
|---|---|---|---|---|---|
| S1 | 1.9814E−01 | −3.2292E−01 | 4.4170E−01 | −5.0199E−01 | 3.8645E−01 |
| S2 | 1.9347E−02 | −2.0791E−01 | 2.1158E−01 | −2.2213E−01 | 3.8643E−01 |
| S3 | 5.4620E−03 | −1.6261E−01 | 2.0462E−01 | −4.0410E−01 | 9.3159E−01 |
| S4 | −5.5429E−02 | 7.4454E−02 | −2.6843E−01 | 5.1903E−01 | −5.4114E−01 |
| S5 | −8.3040E−02 | 1.4005E−01 | −4.5056E−01 | 1.0351E+00 | −1.6429E+00 |
| S6 | 1.0173E−01 | −1.6113E−01 | 2.2797E−01 | −2.9521E−01 | 2.2019E−01 |
| S7 | −4.6717E−02 | 1.5938E−01 | −6.4159E−01 | 1.4931E+00 | −2.2408E+00 |
| S8 | −1.3960E−01 | 4.3043E−01 | −1.5257E+00 | 3.1574E+00 | −4.1823E+00 |
| S9 | −5.2670E−02 | 3.1052E−01 | −1.0896E+00 | 2.0674E+00 | −2.5523E+00 |
| S10 | 4.8803E−02 | −2.3454E−01 | 4.3454E−01 | −5.1730E−01 | 3.7797E−01 |
| S11 | 2.2435E−01 | −5.1892E−01 | 6.4322E−01 | −6.6872E−01 | 5.1477E−01 |
| S12 | 1.1866E−01 | −1.5603E−01 | 1.0317E−01 | 6.7512E−02 | −5.5647E−02 |
| S13 | −3.2033E−01 | 1.3105E−01 | 1.7158E−02 | −8.8439E−02 | 7.0055E−02 |
| S14 | −2.4300E−01 | 1.6952E−01 | −9.6721E−02 | 3.8326E−02 | −9.9892E−03 |

| surface number | A14 | A16 | A18 | A20 |
|---|---|---|---|---|
| S1 | −1.9113E−01 | 5.8370E−02 | −1.0008E−02 | 7.3800E−04 |
| S2 | −4.3362E−01 | 2.6909E−01 | −8.7430E−02 | 1.1580E−02 |
| S3 | −1.1090E+00 | 6.9077E−01 | −2.2074E−01 | 2.8851E−02 |
| S4 | 3.0561E−01 | −8.6402E−02 | 9.1107E−03 | 1.5514E−04 |
| S5 | 1.7540E+00 | −1.1795E+00 | 4.5306E−01 | −7.6055E−02 |
| S6 | 3.6486E−02 | −1.7295E−01 | 1.0809E−01 | −2.2411E−02 |
| S7 | 2.1013E+00 | −1.1606E+00 | 3.4272E−01 | −4.1659E−02 |
| S8 | 3.5472E+00 | −1.8328E+00 | 5.2195E−01 | −6.2620E−02 |
| S9 | 2.0229E+00 | −9.7433E−01 | 2.5740E−01 | −2.8478E−02 |
| S10 | −1.6879E−01 | 4.4686E−02 | −6.41174E−03 | 3.8473E−04 |
| S11 | −2.6519E−01 | 8.3743E−02 | −1.4440E−02 | 1.0365E−03 |
| S12 | 2.2280E−02 | −4.9504E−03 | 5.8021E−04 | −2.7914E−05 |
| S13 | −2.7323E−02 | 5.7926E−03 | −6.3882E−04 | 2.8754E−05 |
| S14 | 1.6435E−03 | −1.6259E−04 | 8.7887E−06 | −1.9893E−07 |

Table 3 below shows the effective focal lengths f1-f7 of the lenses of the optical imaging lens assembly in Embodiment 1, the total effective focal length f of the optical imaging lens assembly, the total track length TTL (i.e., the distance on the optical axis from the object-side surface S1 the first lens E1 to the image plane S17) of the optical imaging lens assembly, and the half of the diagonal length ImgH of the effective pixel area of the photosensitive element on the image plane S17 of the optical imaging lens assembly.

TABLE 3

| parameter | f1 (mm) | f2 (mm) | f3 (mm) | f4 (mm) | f5 (mm) |
|---|---|---|---|---|---|
| numerical value | 12.03 | 3.70 | −5.01 | −199.87 | 20.52 |

| parameter | f6 (mm) | f7 (mm) | f (mm) | TTL (mm) | ImgH (mm) |
|---|---|---|---|---|---|
| numerical value | 17.29 | −8.66 | 4.09 | 4.97 | 2.70 |

According to Table 3, the effective focal length f1 of the first lens E1 and the effective focal length f2 of the second lens E2 satisfy: f2/|f1|=0.31. The effective focal length f3 of the third lens E3 and the total effective focal length f of the optical imaging lens assembly satisfy: f/f3=−0.82. The effective focal length f4 of the fourth lens E4 and the total effective focal length f of the optical imaging lens assembly satisfy: f/|f4|=0.02. The effective focal length f5 of the fifth lens E6, the effective focal length f6 of the sixth lens E6 and the total effective focal length f of the optical imaging lens assembly satisfy: |f/f5|+|f/f6|=0.44. The effective focal length f7 of the seventh lens E7 and the total effective focal length f of the optical imaging lens assembly satisfy: f/|f7|=0.47. The total track length TTL of the optical imaging lens assembly and the half of the diagonal length ImgH of the effective pixel area of the photosensitive element on the image plane S17 of the optical imaging lens assembly satisfy: TTL/ImgH=1.84.

In the optical imaging lens assembly of this embodiment, the center thickness CT4 of the fourth lens on the optical axis and the edge thickness ET5 of the fourth lens at the maximum radius satisfy: ET4/CT4=0.81.

Figures 2A, 2B:
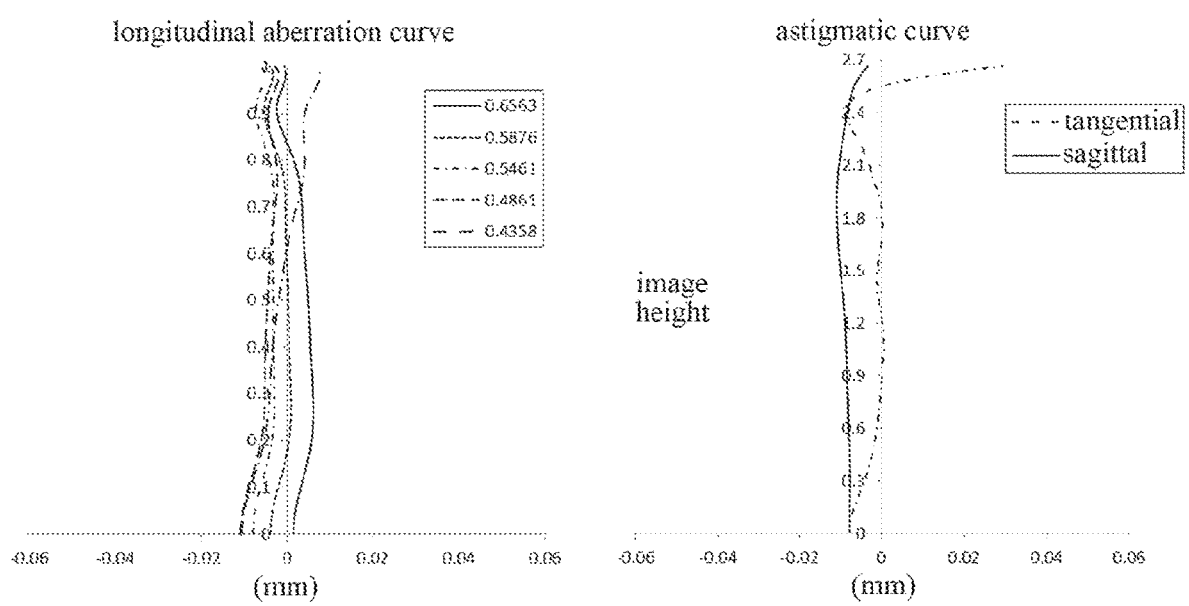
FIGS. 2A-2D respectively illustrate a longitudinal aberration curve, an astigmatic curve, a distortion curve, and a lateral color curve of the optical imaging lens assembly according to Embodiment 1.
Figures 2C, 2D:
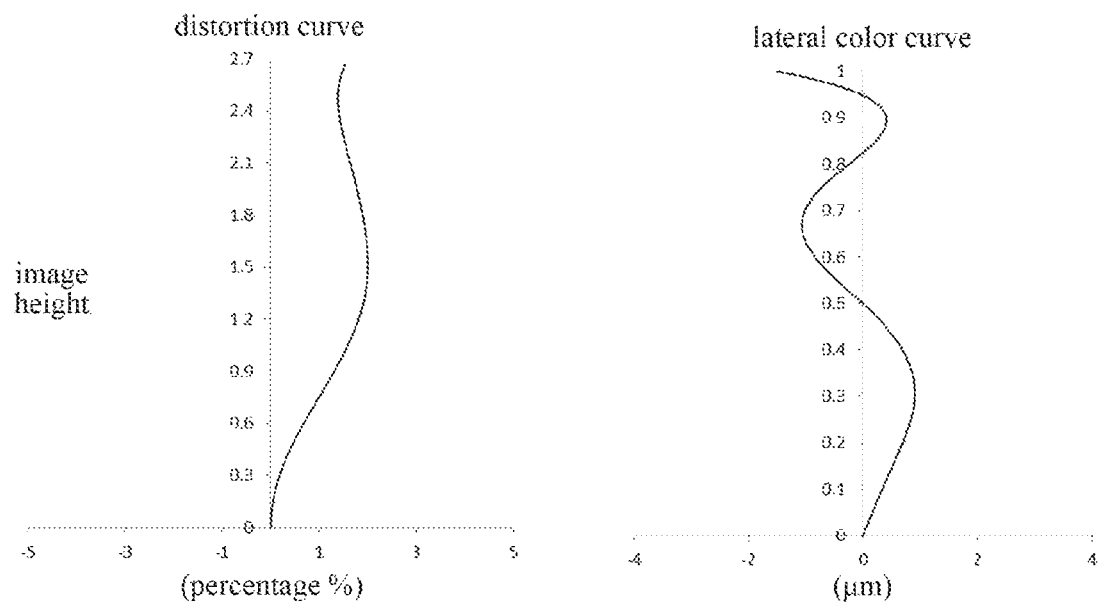

FIG. 2A illustrates the longitudinal aberration curve of the optical imaging lens assembly according to Embodiment 1, representing deviations of focal points of light of different wavelengths converged after passing through a lens assembly FIG. 2B illustrates the astigmatic curve of the optical imaging lens assembly according to Embodiment 1, representing the curvature of the tangential image plane and the curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-3D that the optical imaging lens assembly according to Embodiment 1 can achieve a good imaging quality.

Embodiment 2

Figure 3:
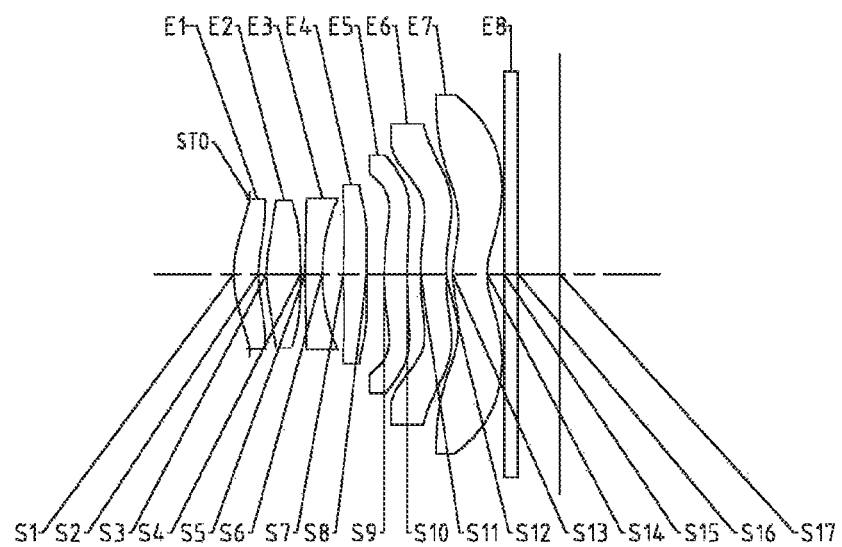
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens 84 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the imaging quality of the optical imaging lens assembly.

Table 4 shows the surface type, the radius of curvature, the thickness, the material and the conic coefficient of each lens in the optical imaging lens assembly in Embodiment 2. The units of the radius of curvature and the thickness are both millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f7 of the lenses of the optical imaging lens assembly in Embodiment 2, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2413 | | | |
| S1 | aspheric | 1.8211 | 0.3753 | 1.55 | 56.1 | −15.5795 |
| S2 | aspheric | 1.8803 | 0.1229 | | | −17.6658 |
| S3 | aspheric | 2.0406 | 0.5240 | 1.55 | 56.1 | −15.8172 |
| S4 | aspheric | −14.2081 | 0.0690 | | | 89.2223 |
| S5 | aspheric | 9.0264 | 0.2600 | 1.67 | 20.4 | 43.7944 |
| S6 | aspheric | 2.9562 | 0.3250 | | | −15.5574 |
| S7 | aspheric | 8.5528 | 0.3548 | 1.65 | 23.5 | −99.0000 |
| S8 | aspheric | 8.6701 | 0.2675 | | | 5.5905 |
| S9 | aspheric | 4.4619 | 0.3549 | 1.55 | 56.1 | −28.1862 |
| S10 | aspheric | 15.7593 | 0.2000 | | | −99.0000 |
| S11 | aspheric | 5.9681 | 0.3909 | 1.65 | 23.5 | −70.6702 |
| S12 | aspheric | 3.4692 | 0.1000 | | | −99.0000 |
| S13 | aspheric | 1.2678 | 0.5257 | 1.55 | 56.1 | −8.4090 |
| S14 | aspheric | 1.0607 | 0.2622 | | | −4.6539 |
| S15 | spherical | infinite | 0.2100 | 1.52 | 64.2 | |
| S16 | spherical | infinite | 0.6378 | | | |
| S17 | spherical | infinite | | | | |

TABLE 5

| surface number | A4 | A6 | A8 | A10 | A12 |
|---|---|---|---|---|---|
| S1 | 2.1568E−01 | −3.7435E−01 | 5.0620E−01 | −5.8492E−01 | 4.4124E−01 |
| S2 | 8.9671E−02 | −3.2814E−01 | 3.0544E−01 | −2.8957E−01 | 3.4510E−01 |
| S3 | −8.0009E−04 | 1.3832E−01 | −8.4595E−01 | 1.3843E+00 | −1.0284E+00 |
| S4 | −4.6929E−02 | 5.2336E−02 | −3.5508E−01 | 7.6162E−01 | −8.0751E−01 |
| S5 | −6.9491E−02 | 3.1235E−01 | −1.2014E+00 | 2.4058E+00 | −2.8517E+00 |

TABLE 5-continued

| | | | | | |
|---|---|---|---|---|---|
| S6 | 9.6408E−02 | −2.2380E−01 | 8.5846E−01 | −2.2568E+00 | 3.5543E+00 |
| S7 | −9.1085E−02 | 1.9923E−01 | −5.3698E−01 | 1.0069E+00 | −1.1522E+00 |
| S8 | −1.4244E−01 | 2.0372E−01 | −5.8597E−01 | 1.0026E+00 | −1.0079E+00 |
| S9 | 9.3661E−03 | 1.8729E−01 | −5.9447E−01 | 8.2254E−01 | −7.1947E−01 |
| S10 | 7.1234E−02 | −1.0899E−01 | 1.0225E−01 | −1.0325E−01 | 6.2549E−02 |
| S11 | 2.3774E−01 | −5.1589E−01 | 4.8805E−01 | −3.0329E−01 | 1.1584E−01 |
| S12 | 1.6380E−01 | −2.8938E−01 | 2.1152E−01 | −9.8367E−02 | 2.9996E−02 |
| S13 | −2.5402E−01 | 1.3844E−01 | −5.2410E−02 | 1.5891E−02 | −3.5018E−03 |
| S14 | −1.6977E−01 | 1.0073E−01 | −4.1395E−02 | 1.1391E−02 | −2.0721E−03 |

| surface number | A14 | A16 | A18 | A20 |
|---|---|---|---|---|
| S1 | −2.0124E−01 | 5.3894E−02 | −7.8284E−03 | 4.7720E−04 |
| S2 | −2.5526E−01 | 1.0037E−01 | −1.9845E−02 | 1.5632E−03 |
| S3 | 3.9086E−01 | −7.7419E−02 | 8.5688E−03 | −6.7175E−04 |
| S4 | 4.7557E−01 | −1.5780E−01 | 2.7611E−02 | −1.9835E−03 |
| S5 | 2.0061E+00 | −7.8854E−01 | 1.5064E−01 | −9.3830E−03 |
| S6 | −3.4090E+00 | 1.9512E+00 | −6.0568E−01 | 7.7908E−02 |
| S7 | 7.9348E−01 | −3.2093E−01 | 7.0083E−02 | −6.3682E−03 |
| S8 | 6.1492E−01 | −2.2208E−01 | 4.3608E−02 | −3.5907E−03 |
| S9 | 4.0353E−01 | −1.3977E−01 | 2.7138E−02 | −2.2486E−03 |
| S10 | −2.0974E−02 | 3.9117E−03 | −3.8200E−04 | 1.5270E−05 |
| S11 | −2.4696E−02 | 2.4724E−03 | −4.0084E−05 | −6.8407E−06 |
| S12 | −5.8052E−03 | 6.7861E−04 | −4.3460E−05 | 1.1665E−06 |
| S13 | 5.1148E−04 | −4.6234E−05 | 2.3309E−06 | −4.9973E−08 |
| S14 | 2.4251E−04 | −1.7434E−05 | 6.9687E−07 | −1.1803E−08 |

TABLE 6

| parameter | f1 (mm) | f2 (mm) | f3 (mm) | f4 (mm) | f5 (mm) |
|---|---|---|---|---|---|
| numerical value | 32.68 | 3.30 | −6.70 | 448.38 | 11.26 |

| parameter | f6 (mm) | f7 (mm) | f (mm) | TTL (mm) | ImgH (mm) |
|---|---|---|---|---|---|
| numerical value | −13.69 | −115.11 | 3.66 | 4.98 | 3.24 |

Figure 4A:
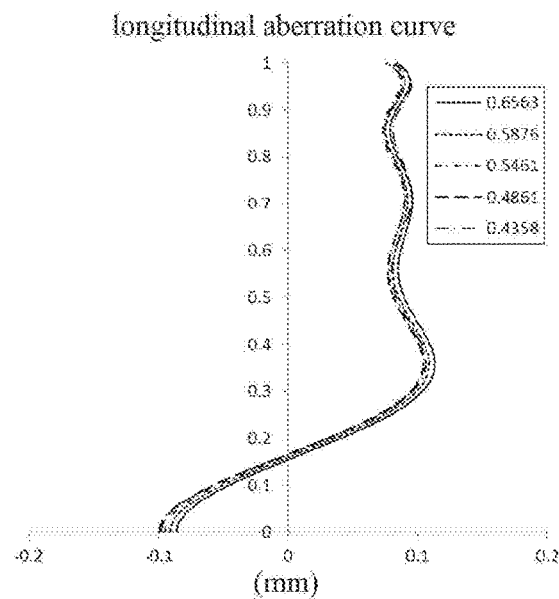
FIGS. 4A-4D respectively illustrate a longitudinal aberration curve, an astigmatic curve, a distortion curve, and a lateral color curve of the optical imaging lens assembly according to Embodiment 2.
Figure 4B:
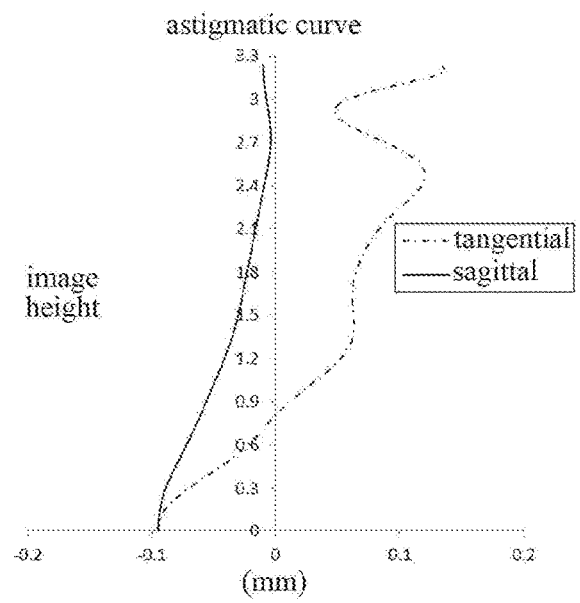
Figure 4C:
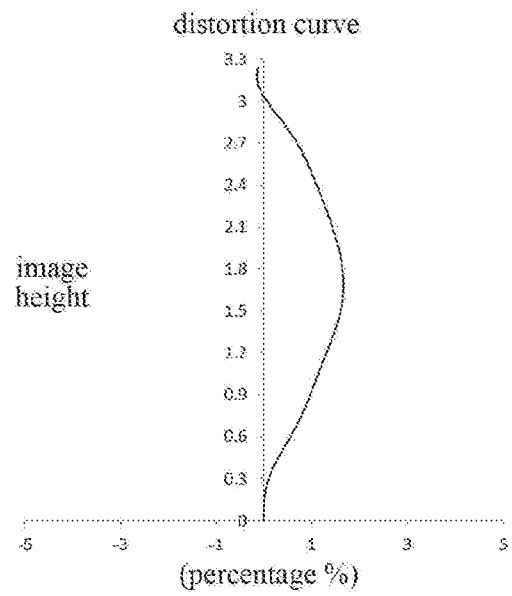
Figure 4D:
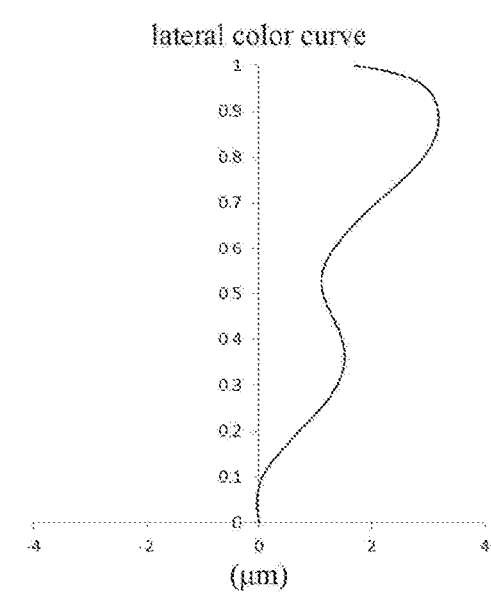

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a positive refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 7 shows the surface type, the radius of curvature, the thickness, the material and the conic coefficient of each lens in the optical imaging lens assembly in Embodiment 3. The units of the radius of curvature and the thickness are both millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1 f7 of the lenses of the optical imaging lens assembly in Embodiment 3, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 7

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2288 | | | |
| S1 | aspheric | 1.8979 | 0.3632 | 1.55 | 56.1 | −15.1783 |
| S2 | aspheric | 2.1154 | 0.1027 | | | −18.0116 |
| S3 | aspheric | 2.3638 | 0.5480 | 1.55 | 56.1 | −15.8378 |
| S4 | aspheric | −13.2836 | 0.0789 | | | 86.0091 |
| S5 | aspheric | 9.5341 | 0.2600 | 1.67 | 20.4 | 43.8529 |
| S6 | aspheric | 3.0428 | 0.3236 | | | −16.1558 |
| S7 | aspheric | 9.0934 | 0.3579 | 1.65 | 23.5 | −98.6008 |
| S8 | aspheric | 8.2409 | 0.2440 | | | 0.6953 |
| S9 | aspheric | 6.5895 | 0.3610 | 1.55 | 56.1 | −29.6768 |
| S10 | aspheric | −83.7655 | 0.1806 | | | 99.0000 |
| S11 | aspheric | 5.4745 | 0.4029 | 1.65 | 23.5 | −46.8778 |
| S12 | aspheric | 3.5038 | 0.1000 | | | −96.6227 |
| S13 | aspheric | 1.1721 | 0.5144 | 1.55 | 56.1 | −6.9459 |
| S14 | aspheric | 1.0047 | 0.2786 | | | −4.0677 |
| S15 | spherical | infinite | 0.2100 | 1.52 | 64.2 | |
| S16 | spherical | infinite | 0.6541 | | | |
| S17 | spherical | infinite | | | | |

TABLE 8

| surface number | A4 | A6 | A8 | A10 | A12 |
|---|---|---|---|---|---|
| S1 | 2.1630E−01 | −4.0114E−01 | 5.6970E−01 | −6.3928E−01 | 4.5938E−01 |
| S2 | 7.6932E−02 | −3.4383E−01 | 3.8004E−01 | −3.3919E−01 | 3.2530E−01 |
| S3 | 3.3739E−02 | −1.7623E−01 | 1.2337E−01 | −2.1140E−01 | 5.9860E−01 |
| S4 | −1.9194E−02 | −7.3838E−02 | −4.1754E−02 | 3.3266E−01 | −4.5982E−01 |
| S5 | −2.5479E−02 | 2.4295E−02 | −4.0605E−01 | 1.1090E+00 | −1.4810E+00 |
| S6 | 7.4823E−02 | −8.0041E−02 | 1.5470E−01 | −3.8045E−01 | 6.4804E−01 |
| S7 | −7.2068E−02 | 1.3875E−01 | −3.6346E−01 | 6.5310E−01 | −7.1856E−01 |
| S8 | −1.3912E−01 | 2.5264E−01 | −6.3520E−01 | 9.2615E−01 | −8.2716E−01 |
| S9 | −6.0532E−02 | 3.6199E−01 | −7.5494E−01 | 8.6188E−01 | −6.6208E−01 |
| S10 | −2.3134E−02 | 1.0232E−01 | −9.9439E−02 | 6.1403E−03 | 2.7112E−02 |
| S11 | 1.9664E−01 | −3.7758E−01 | 3.4950E−01 | −2.3163E−01 | 9.2298E−02 |
| S12 | 1.5571E−01 | −2.1286E−01 | 1.2830E−01 | −5.4956E−02 | 1.6580E−02 |
| S13 | −2.2139E−01 | 8.6294E−02 | −1.4592E−02 | 9.1141E−05 | 4.9848E−04 |
| S14 | −1.5803E−01 | 8.1806E−02 | −3.1038E−02 | 8.6596E−03 | −1.6783E−03 |

| surface number | A14 | A16 | A18 | A20 |
|---|---|---|---|---|
| S1 | −2.0048E−01 | 5.1727E−02 | −7.2827E−03 | 4.3241E−04 |
| S2 | −2.1860E−01 | 8.3348E−02 | −1.6364E−02 | 1.2921E−03 |
| S3 | −6.7654E−01 | 3.5944E−01 | −9.2069E−02 | 9.2153E−03 |
| S4 | 3.0309E−01 | −1.0633E−01 | 1.9139E−02 | −1.3935E−03 |
| S5 | 1.0683E+00 | −3.9294E−01 | 5.7956E−02 | −1.9945E−04 |
| S6 | −6.6922E−01 | 4.0389E−01 | −1.2765E−01 | 1.6156E−02 |
| S7 | 4.8241E−01 | −1.9212E−01 | 4.1472E−02 | −3.7258E−03 |
| S8 | 4.6556E−01 | −1.5976E−01 | 3.0522E−02 | −2.4938E−03 |
| S9 | 3.3851E−01 | −1.0877E−01 | 1.9722E−02 | −1.5303E−03 |
| S10 | −1.4129E−02 | 3.1620E−03 | −3.4164E−04 | 1.4582E−05 |
| S11 | −1.9177E−02 | 1.5097E−03 | 7.3566E−05 | −1.3294E−05 |
| S12 | −3.2181E−03 | 3.7354E−04 | −2.3415E−05 | 6.0692E−07 |
| S13 | −1.0873E−04 | 1.1212E−05 | −5.8396E−07 | 1.2288E−08 |
| S14 | 2.1093E−04 | −1.6106E−05 | 6.7346E−07 | −1.1771E−08 |

TABLE 9

| parameter | f1 (mm) | f2 (mm) | f3 (mm) | f4 (mm) | f5 (mm) |
|---|---|---|---|---|---|
| numerical value | 21.24 | 3.72 | −6.80 | −163.14 | 11.19 |

| parameter | f6 (mm) | f7 (mm) | f (mm) | TTL (mm) | ImgH (mm) |
|---|---|---|---|---|---|
| numerical value | −16.41 | 150.22 | 3.82 | 4.98 | 3.39 |

Figures 6C, 6D:
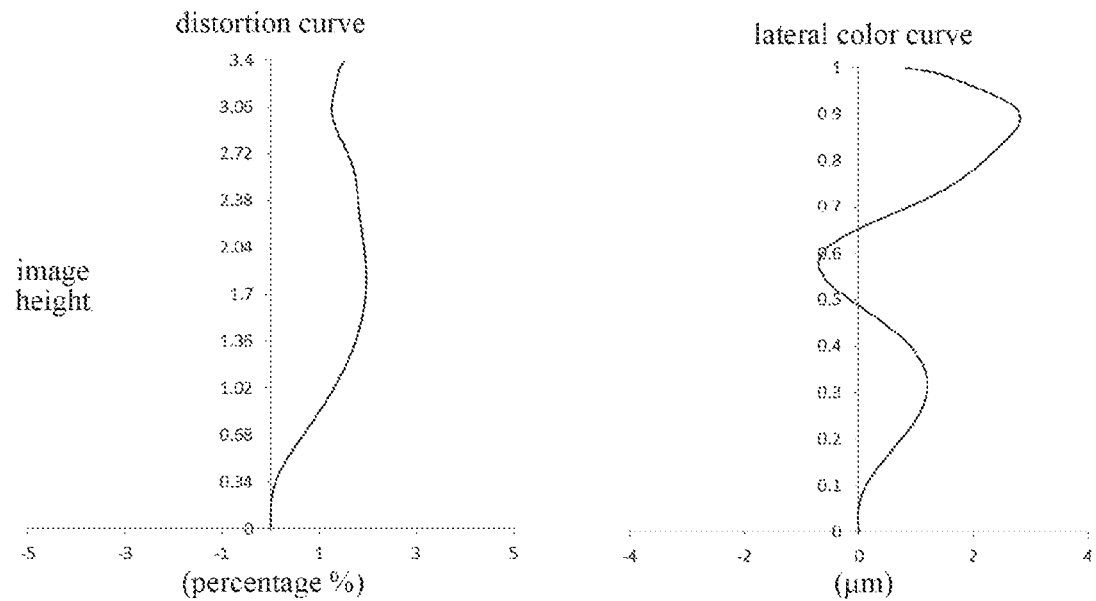

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing the curvature of the tangential image plane and the curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
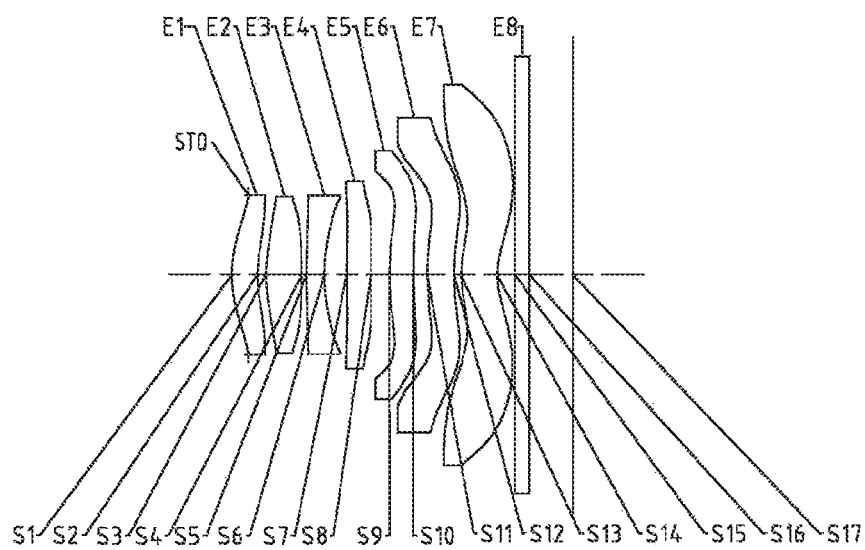
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes, sequentially along the optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the imaging quality of the optical imaging lens assembly.

Table 10 shows the surface type, the radius of curvature, the thickness, the material and the conic coefficient of each lens of the optical imaging lens assembly in Embodiment 4. The units of the radius of curvature and the thickness are both millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f7 of the lenses of the optical imaging lens assembly in Embodiment 4, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2534 | | | |
| S1 | aspheric | 1.9122 | 0.3940 | 1.55 | 56.1 | −15.5795 |
| S2 | aspheric | 1.9743 | 0.1291 | | | −17.6658 |
| S3 | aspheric | 2.1426 | 0.5502 | 1.55 | 56.1 | −15.8172 |
| S4 | aspheric | −14.9185 | 0.0725 | | | 89.2223 |
| S5 | aspheric | 9.4777 | 0.2730 | 1.67 | 20.4 | 43.7944 |
| S6 | aspheric | 3.1040 | 0.3412 | | | −15.5574 |
| S7 | aspheric | 9.4500 | 0.3725 | 1.65 | 23.5 | −99.0000 |
| S8 | aspheric | 9.1036 | 0.2809 | | | 5.5905 |
| S9 | aspheric | 4.6850 | 0.3727 | 1.55 | 56.1 | −28.1862 |
| S10 | aspheric | 16.5473 | 0.2100 | | | −99.0000 |
| S11 | aspheric | 6.2665 | 0.4105 | 1.65 | 23.5 | −70.6702 |
| S12 | aspheric | 3.6427 | 0.1050 | | | −99.0000 |
| S13 | aspheric | 1.3312 | 0.5520 | 1.55 | 56.1 | −8.4090 |
| S14 | aspheric | 1.1137 | 0.2754 | | | −4.6539 |
| S15 | spherical | infinite | 0.2205 | 1.52 | 64.2 | |
| S16 | spherical | infinite | 0.6697 | | | |
| S17 | spherical | infinite | | | | |

TABLE 11

| surface number | A4 | A6 | A8 | A10 | A12 |
|---|---|---|---|---|---|
| S1 | 1.8632E−01 | −2.9331E−01 | 3.5974E−01 | −3.7705E−01 | 2.5799E−01 |
| S2 | 7.7461E−02 | −2.5711E−01 | 2.1707E−01 | −1.8666E−01 | 2.0177E−01 |
| S3 | −6.9115E−04 | 1.0838E−01 | −6.0120E−01 | 8.9231E−01 | −6.0126E−01 |
| S4 | −4.0539E−02 | 4.1006E−02 | −2.5235E−01 | 4.909513−01 | −4.7214E−01 |
| S5 | −6.0029E−02 | 2.4474E−01 | −8.5382E−01 | 1.5508E+00 | −1.6673E+00 |
| S6 | 8.3281E−02 | −1.7535E−01 | 6.1009E−01 | −1.4548E+00 | 2.0782E+00 |
| S7 | −7.8682E−02 | 1.5610E−01 | −3.8162E−01 | 6.4906E−01 | −6.7369E−01 |
| S8 | −1.2304E−01 | 1.5962E−01 | −4.1644E−01 | 6.4630E−01 | −5.8930E−01 |
| S9 | 8.0908E−03 | 1.4675E−01 | −4.2248E−01 | 5.3021E−01 | −4.2066E−01 |
| S10 | 6.1535E−02 | −8.5396E−02 | 7.2669E−02 | −6.6558E−02 | 3.6571E−02 |
| S11 | 2.0537E−01 | −4.0422E−01 | 3.4685E−01 | −1.9550E−01 | 6.7731E−02 |
| S12 | 1.4149E−01 | −2.2673E−01 | 1.5033E−01 | −6.3409E−02 | 1.7538E−02 |
| S13 | −2.1943E−01 | 1.0847E−01 | −3.7247E−02 | 1.0243E−02 | −2.0475E−03 |
| S14 | −1.4665E−01 | 7.8921E−02 | −2.9419E−02 | 7.3430E−03 | −1.2115E−03 |

| surface number | A14 | A16 | A18 | A20 |
|---|---|---|---|---|
| S1 | −1.0672E−01 | 2.5924E−02 | −3.4155E−03 | 1.8884E−04 |
| S2 | −1.3537E−01 | 4.8280E−02 | −8.6585E−03 | 6.1861E−04 |
| S3 | 2.0728E−01 | −3.7240E−02 | 3.7386E−03 | −2.6584E−04 |
| S4 | 2.5221E−01 | −7.5903E−02 | 1.2046E−02 | −7.8492E−04 |
| S5 | 1.0639E+00 | −3.7930E−01 | 6.5726E−02 | −3.7132E−03 |
| S6 | −1.8079E+00 | 9.3857E−01 | −2.6425E−01 | 3.0831E−02 |
| S7 | 4.2080E−01 | −1.5437E−01 | 3.0577E−02 | −2.5201E−03 |
| S8 | 3.2611E−01 | −1.0682E−01 | 1.9026E−02 | −1.4210E−03 |
| S9 | 2.1400E−01 | −6.7231E−02 | 1.1840E−02 | −8.8983E−04 |
| S10 | −1.1123E−02 | 1.8816E−03 | −1.6667E−04 | 6.0429E−06 |
| S11 | −1.3097E−02 | 1.1892E−03 | −1.7488E−05 | −2.7071E−06 |
| S12 | −3.0786E−03 | 3.2642E−04 | −1.8961E−05 | 4.6163E−07 |
| S13 | 2.7125E−04 | −2.2240E−05 | 1.0170E−06 | −1.9776E−08 |
| S14 | 1.2861E−04 | −8.3860E−06 | 3.0404E−07 | −4.6707E−09 |

TABLE 12

| parameter | f1 (mm) | f2 (mm) | f3 (mm) | f4 (mm) | f5 (mm) |
|---|---|---|---|---|---|
| numerical value | 34.31 | 3.47 | −7.03 | −665.66 | 11.83 |

| parameter | f6 (mm) | f7 (mm) | f (mm) | TTL (mm) | ImgH (mm) |
|---|---|---|---|---|---|
| numerical value | −14.37 | −120.86 | 3.89 | 5.23 | 3.50 |

Figure 8A:
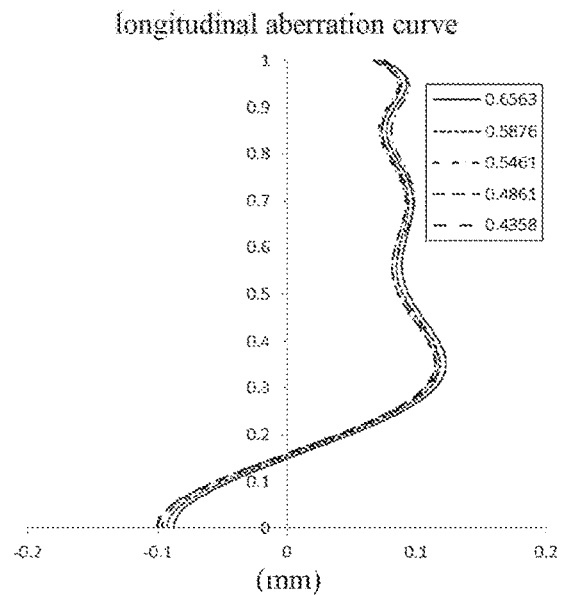
FIGS. 8A-8D respectively illustrate a longitudinal aberration curve, an astigmatic curve, a distortion curve, and a lateral color curve of the optical imaging lens assembly according to Embodiment 4.
Figure 8B:
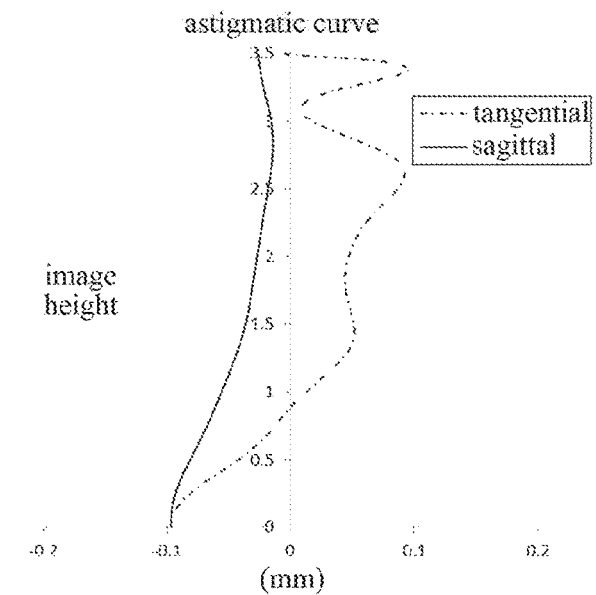
Figure 8C:
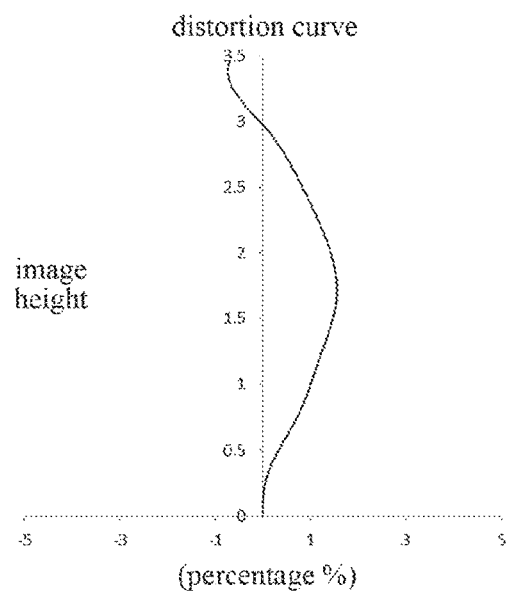
Figure 8D:
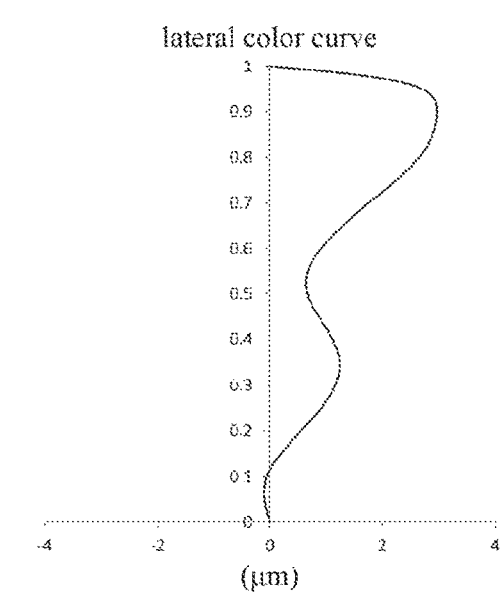

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the optical imaging lens assembly according to Embodiment 4, representing the curvature of the tangential image plane and the curvature of the sagittal image plane. FIG. 8C illustrates the distortion curve of the optical imaging lens assembly according to Embodiment 4, representing amounts of distortion at different viewing angles. FIG. 8D illustrates the lateral color curve of the optical imaging lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 13 shows the surface type, the radius of curvature, the thickness, the material and the conic coefficient of each lens of the optical imaging lens assembly in Embodiment 5. The units of the radius of curvature and the thickness are both millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f7 of the lenses of the optical imaging lens assembly in Embodiment 5, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.1867 | | | |
| S1 | aspheric | 2.0051 | 0.3867 | 1.55 | 56.1 | −13.7389 |
| S2 | aspheric | 2.6210 | 0.1409 | | | −16.7731 |
| S3 | aspheric | 2.7749 | 0.4670 | 1.55 | 56.1 | −14.3234 |
| S4 | aspheric | −12.9260 | 0.1000 | | | 58.2020 |
| S5 | aspheric | 9.6255 | 0.1519 | 1.67 | 20.4 | 51.1981 |
| S6 | aspheric | 2.8665 | 0.3755 | | | −18.7541 |
| S7 | aspheric | 16.6757 | 0.3889 | 1.65 | 23.5 | −99.0000 |
| S8 | aspheric | 20.8446 | 0.2330 | | | 10.7890 |
| S9 | aspheric | 4.3672 | 0.6157 | 1.55 | 56.1 | −51.2485 |
| S10 | aspheric | −6.8076 | 0.2344 | | | −46.6828 |
| S11 | aspheric | −30.4243 | 0.3362 | 1.65 | 23.5 | 98.4798 |
| S12 | aspheric | 31.2177 | 0.4335 | | | −99.0000 |
| S13 | aspheric | 2.8824 | 0.5523 | 1.55 | 56.1 | 0.5796 |
| S14 | aspheric | 1.2860 | 0.4064 | | | −4.1122 |
| S15 | spherical | infinite | 0.2100 | 1.52 | 64.2 | |
| S16 | spherical | infinite | 0.0800 | | | |
| S17 | spherical | infinite | | | | |

TABLE 14

| surface number | A4 | A6 | A8 | A10 | A12 |
|---|---|---|---|---|---|
| S1 | 1.7533E−01 | −2.6513E−01 | 3.1400E−01 | −2.9342E−01 | 1.6546E−01 |
| S2 | 2.0231E−02 | −1.5049E−01 | 1.8310E−01 | −2.2081E−01 | 2.2421E−01 |
| S3 | 4.6545E−03 | −9.7712E−02 | 9.8820E−02 | −1.3297E−01 | 2.2106E−01 |
| S4 | −1.2072E−02 | −4.3975E−02 | −1.3234E−02 | 1.2963E−01 | −1.6283E−01 |
| S5 | −3.4881E−02 | −1.1755E−02 | −5.1663E−02 | 1.2807E−01 | −1.0727E−01 |
| S6 | 6.8683E−02 | −4.5974E−02 | −6.1387E−02 | 2.7656E−01 | −4.8941E−01 |
| S7 | −7.3723E−02 | 1.3588E−01 | −2.9556E−01 | 4.5257E−01 | −4.5756E−01 |
| S8 | −1.3343E−01 | 1.8031E−01 | −3.4407E−01 | 4.4929E−01 | −3.8326E−01 |
| S9 | 1.8533E−02 | 7.2052E−05 | −7.4312E−02 | 1.0486E−01 | −9.1536E−02 |
| S10 | 1.4515E−01 | −2.2412E−01 | 1.9858E−01 | −1.3582E−01 | 6.2641E−02 |
| S11 | 3.2671E−01 | −4.4295E−01 | 3.3447E−01 | −1.9172E−01 | 7.5910E−02 |
| S12 | 2.5732E−01 | −2.7228E−01 | 1.4251E−01 | −5.0119E−02 | 1.2698E−02 |
| S13 | −1.7244E−01 | 5.5352E−02 | −1.1221E−02 | 7.3287E−04 | 3.3411E−05 |
| S14 | −7.9425E−02 | 3.4968E−02 | −1.1476E−02 | 2.6320E−03 | −3.9302E−04 |

| surface number | A14 | A15 | A18 | A20 |
|---|---|---|---|---|
| S1 | −5.1477E−02 | 8.0540E−03 | −4.5423E−04 | −8.6685E−06 |
| S2 | −1.3529E−01 | 4.5161E−02 | −7.7990E−03 | 5.4566E−04 |
| S3 | −1.6955E−01 | 5.3391E−02 | −3.7784E−03 | −7.4273E−04 |
| S4 | 9.6821E−02 | −3.0718E−02 | 5.0252E−03 | −3.3431E−04 |
| S5 | −7.9285E−03 | 7.0207E−02 | −3.9701E−02 | 6.9202E−03 |
| S6 | 5.0630E−01 | −3.0710E−01 | 1.0229E−01 | −1.4349E−02 |
| S7 | 2.9849E−01 | −1.1903E−01 | 2.6057E−02 | −2.3835E−03 |
| S8 | 2.1213E−01 | −7.1984E−02 | 1.3469E−02 | −1.0590E−03 |
| S9 | 5.1860E−02 | −1.8127E−02 | 3.5212E−03 | −2.8774E−04 |
| S10 | −1.8374E−02 | 3.2481E−03 | −3.1259E−04 | 1.2497E−05 |
| S11 | −1.9039E−02 | 2.8616E−03 | −2.34857E−04 | 8.0999E−06 |
| S12 | −2.3378E−03 | 2.9904E−04 | −2.3462E−05 | 8.3780E−07 |
| S13 | −7.5735E−06 | 4.5155E−07 | −1.2252E−08 | 1.2975E−10 |
| S14 | 3.5898E−05 | −1.9173E−06 | 5.4835E−08 | −6.4733E−10 |

TABLE 15

| parameter | f1 (mm) | f2 (mm) | f3 (mm) | f4 (mm) | f5 (mm) |
|---|---|---|---|---|---|
| numerical value | 12.97 | 4.23 | −6.19 | 125.01 | 4.97 |

| parameter | f6 (mm) | f7 (mm) | f (mm) | TTL (mm) | ImgH (mm) |
|---|---|---|---|---|---|
| numerical value | −23.89 | −4.84 | 3.77 | 5.11 | 3.24 |

Figures 10C, 10D:
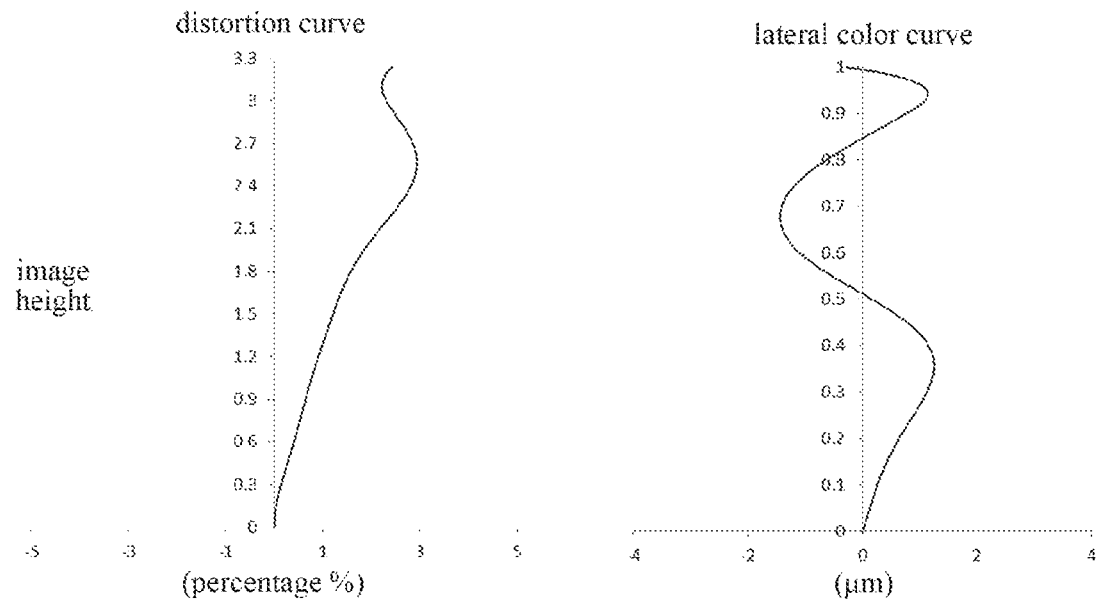

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing the curvature of the tangential image plane and the curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
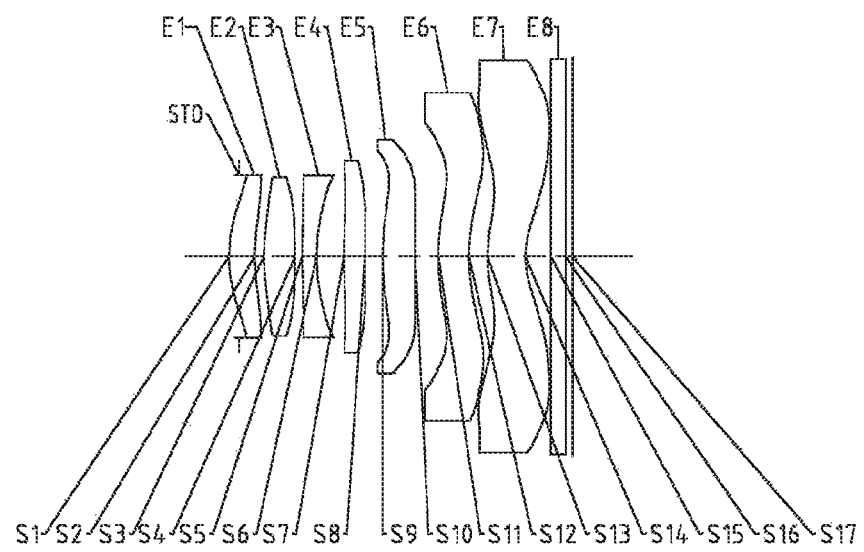
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens S4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 16 shows the surface type, the radius of curvature, the thickness, the material and the conic coefficient of each lens of the optical imaging lens assembly in Embodiment 6. The units of the radius of curvature and the thickness are both millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f7 of the lenses of the optical imaging lens assembly in Embodiment 6, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 16

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.1475 | | | |
| S1 | aspheric | 1.9666 | 0.3694 | 1.55 | 56.1 | −14.2638 |
| S2 | aspheric | 2.6958 | 0.1318 | | | −16.7672 |
| S3 | aspheric | 2.8746 | 0.4478 | 1.55 | 56.1 | −16.1203 |
| S4 | aspheric | −13.4071 | 0.1010 | | | 93.1408 |
| S5 | aspheric | 9.3572 | 0.2044 | 1.67 | 20.4 | 47.8312 |
| S6 | aspheric | 2.8459 | 0.3930 | | | −16.1148 |
| S7 | aspheric | 9.2278 | 0.2979 | 1.65 | 23.5 | −90.0621 |
| S8 | aspheric | 10.0155 | 0.2535 | | | 17.2660 |
| S9 | aspheric | 4.3360 | 0.4679 | 1.55 | 56.1 | 1.5482 |
| S10 | aspheric | −17.9344 | 0.3323 | | | 99.0000 |
| S11 | aspheric | 4.8589 | 0.4359 | 1.65 | 23.5 | −37.3984 |
| S12 | aspheric | 3.1089 | 0.2625 | | | −23.7896 |
| S13 | aspheric | 1.6870 | 0.5440 | 1.55 | 56.1 | −5.9571 |
| S14 | aspheric | 1.1906 | 0.3652 | | | −3.2211 |
| S15 | spherical | infinite | 0.2100 | 1.52 | 64.2 | |
| S16 | spherical | infinite | 0.1007 | | | |
| S17 | spherical | infinite | | | | |

TABLE 17

| surface number | A4 | A6 | A8 | A10 | A12 |
|---|---|---|---|---|---|
| S1 | 1.9993E−01 | −3.5970E−01 | 6.3875E−01 | −1.1173E+00 | 1.5557E+00 |
| S2 | 3.0611E−03 | −1.3098E−01 | 1.4136E−01 | −1.5461E−01 | 2.1269E−01 |
| S3 | −7.2882E−03 | −9.7942E−02 | 2.0214E−02 | 1.9029E−01 | −3.6293E−01 |
| S4 | −8.5963E−03 | −1.2802E−01 | 1.7279E−01 | −7.9144E−02 | −2.9720E−02 |
| S5 | 1.5950E−04 | −1.5849E−01 | 2.4554E−01 | −2.3837E−01 | 2.0766E−01 |
| S6 | 9.4168E−02 | −1.3971E−01 | 1.5609E−01 | −6.9295E−02 | −1.0420E−01 |
| S7 | −5.1204E−02 | 7.6569E−02 | −1.7396E−01 | 3.0900E−01 | −3.6252E−01 |
| S8 | −8.5519E−02 | 8.7705E−03 | 1.6182E−02 | −4.0450E−02 | 6.6374E−02 |
| S9 | 3.1327E−02 | −9.4393E−02 | 4.4070E−02 | 2.3990E−02 | −6.9875E−02 |
| S10 | 1.4141E−01 | −2.1812E−01 | 1.7250E−01 | −9.0983E−02 | 2.2676E−02 |
| S11 | 1.7362E−01 | −2.5720E−01 | 2.0271E−01 | −1.3211E−01 | 6.0964E−02 |
| S12 | 1.1254E−01 | −1.0595E−01 | 3.5253E−02 | −5.3033E−03 | 3.5232E−04 |
| S13 | −1.7409E−01 | 5.2651E−02 | 3.8380E−03 | −7.9804E−03 | 2.8088E−03 |
| S14 | −1.2148E−01 | 5.1575E−02 | −1.2156E−02 | −2.7660E−04 | 1.2555E−03 |

| surface number | A14 | A16 | A18 | A20 |
|---|---|---|---|---|
| S1 | −1.5670E−00 | 1.0278E+00 | −3.8378E−01 | 6.1344E−02 |
| S2 | −2.1545E−01 | 1.4684E−01 | −5.9606E−02 | 1.0380E−02 |
| S3 | 4.7797E−01 | −3.9855E−01 | 1.7523E−01 | −3.1126E−02 |
| S4 | 6.2454E−02 | −4.9273E−02 | 2.4426E−02 | −5.4507E−03 |
| S5 | −2.2236E−01 | 1.9261E−01 | −8.7381E−02 | 1.5198E−02 |
| S6 | 2.1940E−01 | −1.7424E−01 | 6.9183E−02 | −1.1236E−02 |
| S7 | 2.7220E−01 | −1.2697E−01 | 3.3765E−02 | −3.9280E−03 |
| S8 | −6.4766E−02 | 3.6578E−02 | −1.0978E−02 | 1.3676E−03 |
| S9 | 5.8303E−02 | −2.5278E−02 | 5.7492E−03 | −5.3514E−04 |
| S10 | 1.9014E−03 | −2.6705E−03 | 6.2727E−04 | −5.1081E−05 |
| S11 | −1.7614E−02 | 3.0213E−03 | −2.8571E−04 | 1.1755E−05 |
| S12 | −5.7648E−05 | 1.9369E−05 | −2.5774E−06 | 1.1741E−07 |
| S13 | −5.1365E−04 | 5.3426E−05 | −2.9970E−06 | 7.0571E−08 |
| S14 | −4.0285E−04 | 6.0327E−05 | −4.4455E−06 | 1.2950E−07 |

TABLE 18

| parameter | f1 (mm) | f2 (mm) | f3 (mm) | f4 (mm) | f5 (mm) |
|---|---|---|---|---|---|
| numerical value | 11.30 | 4.38 | −6.22 | 158.81 | 6.44 |

| parameter | f6 (mm) | f7 (mm) | f (mm) | TTL (mm) | ImgH (mm) |
|---|---|---|---|---|---|
| numerical value | −14.86 | −12.09 | 3.58 | 4.92 | 2.84 |

Figure 12A:
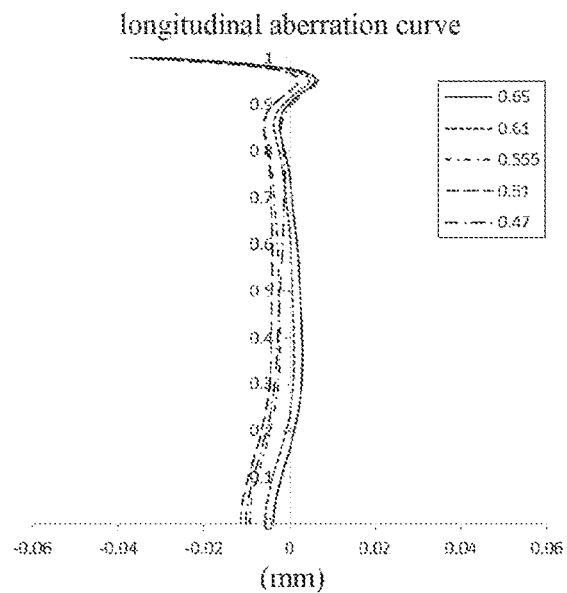
FIGS. 12A-12D respectively illustrate a longitudinal aberration curve, an astigmatic curve, a distortion curve, and a lateral color curve of the optical imaging lens assembly according to Embodiment 6.
Figure 12B:
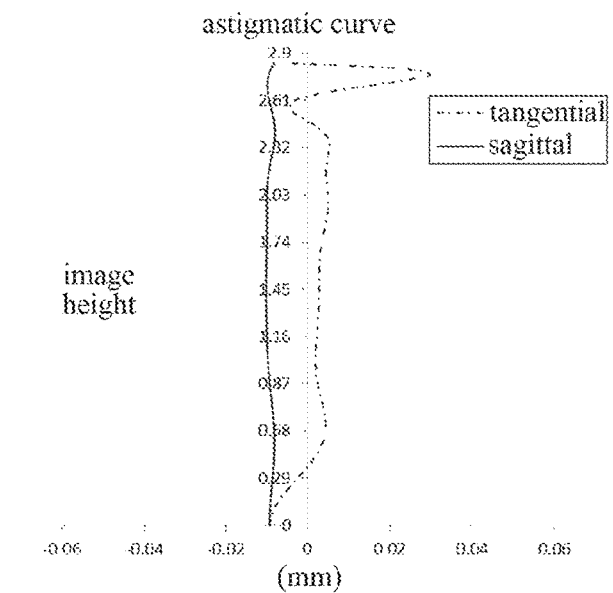
Figure 12C:
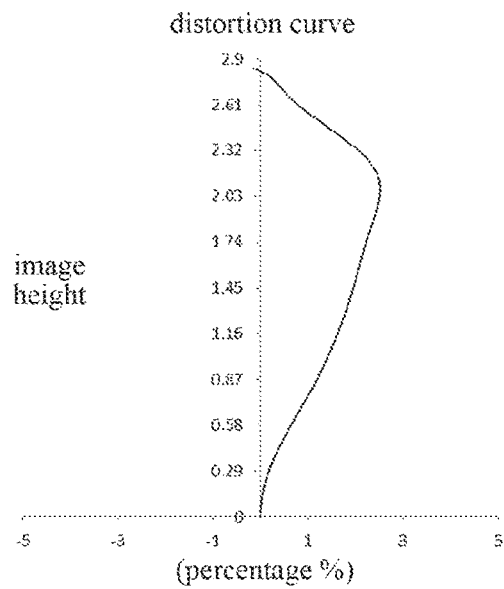
Figure 12D:
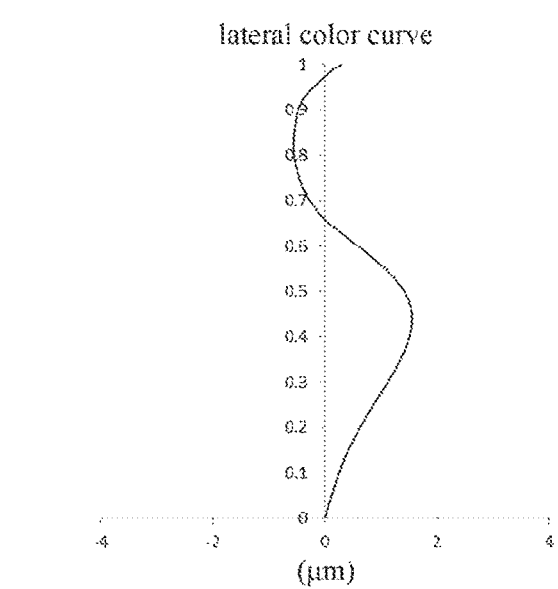

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing the curvature of the tangential image plane and the curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a negative refractive power, an object-side surface S1b of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a positive refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 19 shows the surface type, the radius of curvature, the thickness, the material and the conic coefficient of each lens of the optical imaging lens assembly in Embodiment 7. The units of the radius of curvature and the thickness are both millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f7 of the lenses of the optical imaging lens assembly in Embodiment 7, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 19

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2534 | | | |
| S1 | aspheric | 1.9122 | 0.3940 | 1.55 | 56.1 | −15.5795 |
| S2 | aspheric | 1.9743 | 0.1291 | | | −17.6658 |
| S3 | aspheric | 2.1426 | 0.5502 | 1.55 | 56.1 | −15.8172 |
| S4 | aspheric | −14.9185 | 0.0725 | | | 89.2223 |
| S5 | aspheric | 9.4777 | 0.2730 | 1.67 | 20.4 | 43.7944 |
| S6 | aspheric | 3.1040 | 0.3412 | | | −15.5574 |
| S7 | aspheric | 8.9804 | 0.3725 | 1.65 | 23.5 | −99.0000 |
| S8 | aspheric | 9.1036 | 0.2809 | | | 5.5905 |
| S9 | aspheric | 4.6850 | 0.3727 | 1.55 | 56.1 | −28.1862 |
| S10 | aspheric | 16.5473 | 0.2100 | | | −99.0000 |
| S11 | aspheric | 6.2665 | 0.4105 | 1.65 | 23.5 | −70.6702 |
| S12 | aspheric | 3.6427 | 0.1050 | | | −99.0000 |
| S13 | aspheric | 1.3000 | 0.5520 | 1.55 | 56.1 | −8.4090 |
| S14 | aspheric | 1.1137 | 0.2754 | | | −4.6539 |
| S15 | spherical | infinite | 0.2205 | 1.52 | 64.2 | |
| S16 | spherical | infinite | 0.6697 | | | |
| S17 | spherical | infinite | | | | |

TABLE 20

| surface number | A4 | A6 | A8 | A10 | A12 |
|---|---|---|---|---|---|
| S1 | 1.8632E−01 | −2.9331E−01 | 3.5974E−01 | −3.7705E−01 | 2.5799E−01 |
| S2 | 7.7461E−02 | −2.5711E−01 | 2.1707E−01 | −1.8666E−01 | 2.0177E−01 |
| S3 | −6.9115E−04 | 1.0838E−01 | −6.0120E−01 | 8.9231E−01 | −6.0126E−01 |
| S4 | −4.0539E−02 | 4.1006E−02 | −2.5235E−01 | 4.9095E−01 | −4.7214E−01 |
| S5 | −6.0029E−02 | 2.4474E−01 | −8.5382E−01 | 1.5508E+00 | −1.6673E+00 |
| S6 | 8.3281E−02 | −1.7535E−01 | 6.1009E−01 | −1.4548E+00 | 2.0782E+00 |
| S7 | −7.8682E−02 | 1.5610E−01 | −3.8162E−01 | 6.4906E−01 | −6.7369E−01 |
| S8 | −1.2304E−01 | 1.5962E−01 | −4.1644E−01 | 6.4630E−01 | −5.8930E−01 |
| S9 | 8.0908E−03 | 1.4675E−01 | −4.2248E−01 | 5.3021E−01 | −4.2066E−01 |
| S10 | 6.1535E−02 | −8.5396E−02 | 7.2669E−02 | −6.6558E−02 | 3.6571E−02 |
| S11 | 2.0537E−01 | −4.0422E−01 | 3.4685E−01 | −1.9550E−01 | 6.7731E−02 |
| S12 | 1.4149E−01 | −2.2673E−01 | 1.5033E−01 | −6.3409E−02 | 1.7538E−02 |
| S13 | −2.1943E−01 | 1.0847E−01 | −3.7247E−02 | 1.0243E−02 | −2.0475E−03 |
| S14 | −1.4665E−01 | 7.8921E−02 | −2.9419E−02 | 7.3430E−03 | −1.2115E−03 |

| surface number | A14 | A16 | A18 | A20 |
|---|---|---|---|---|
| S1 | −1.0672E−01 | 2.5924E−02 | −3.4155E−03 | 1.8884E−04 |
| S2 | −1.3537E−01 | 4.8280E−02 | −8.6585E−03 | 6.1864E−04 |
| S3 | 2.0728E−01 | −3.7240E−02 | 3.7386E−03 | −2.6584E−04 |
| S4 | 2.5221E−01 | −7.5903E−02 | 1.2046E−02 | −7.8492E−04 |
| S5 | 1.0639E+00 | −3.7930E−01 | 6.5726E−02 | −3.7132E−03 |
| S6 | −1.8079E+00 | 9.3857E−01 | −2.6425E−01 | 3.0831E−02 |
| S7 | 4.2080E−01 | −1.5437E−01 | 3.0577E−02 | −2.5201E−03 |
| S8 | 3.2611E−01 | −1.0682E−01 | 1.9026E−02 | −1.4210E−03 |
| S9 | 2.1400E−01 | −6.7231E−02 | 1.1840E−02 | −8.8983E−04 |
| S10 | −1.1123E−02 | 1.8816E−03 | −1.6667E−04 | 6.0429E−06 |
| S11 | −1.3097E−02 | 1.1892E−03 | −1.7488E−05 | −2.7071E−06 |
| S12 | −3.0786E−03 | 3.2642E−04 | −1.8961E−05 | 4.6163E−07 |
| S13 | 2.7125E−04 | −2.2240E−05 | 1.0170E−06 | −1.9776E−08 |
| S14 | 1.2861E−04 | −8.3860E−06 | 3.0404E−07 | −4.6707E−09 |

TABLE 21

| parameter | f1 (mm) | f2 (mm) | f3 (mm) | f4 (mm) | f5 (mm) |
|---|---|---|---|---|---|
| numerical value | 34.31 | 3.47 | −7.03 | 470.80 | 11.83 |

| parameter | f6 (mm) | f7 (mm) | f (mm) | TTL (mm) | ImgH (mm) |
|---|---|---|---|---|---|
| numerical value | −14.37 | 303.13 | 3.78 | 5.23 | 3.50 |

Figures 14C, 14D:
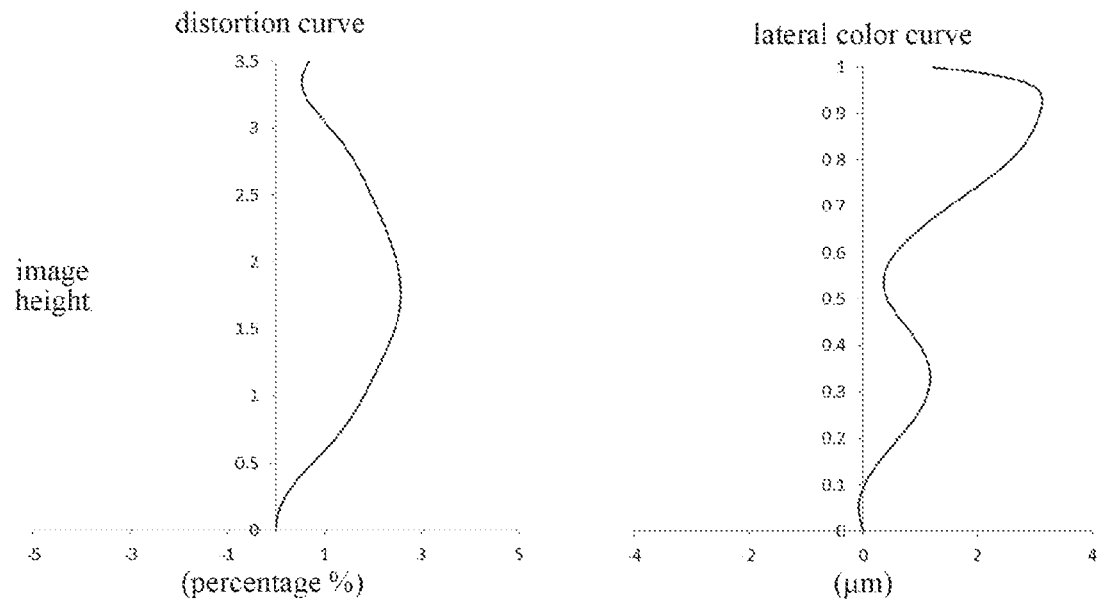

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing the curvature of the tangential image plane and the curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
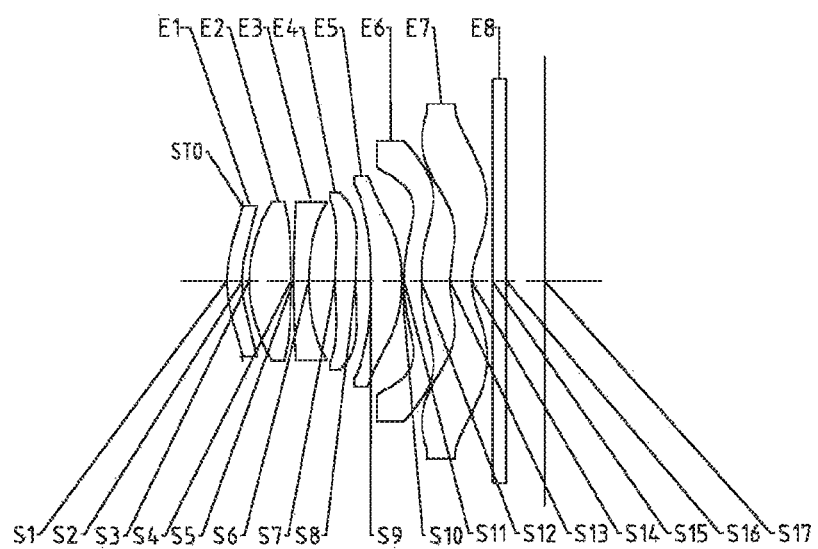
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a negative refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a post: refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 22 shows the surface type, the radius of curvature, the thickness, the material and the conic coefficient of each lens of the optical imaging lens assembly in Embodiment 8. The units of the radius of curvature and the thickness are both millimeters (mm). Table 23 shows the high-order coefficients applicable to each aspheric surface in Embodiment 8 The surface type of each aspheric surface may be defined by the formula (1) given in Embodiment 1. Table 24 shows the effective focal lengths f1-f7 of the lenses of the optical imaging lens assembly in Embodiment 8, the total effective focal length f of the optical imaging lens assembly, the total track length TTL of the optical imaging lent assembly, and the half of the diagonal length ImgH of the effective pixel area of the photosensitive element on the image plane S17 of the optical imaging lens assembly.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.2498 | | | |
| S1 | aspheric | 1.8674 | 0.2400 | 1.55 | 56.1 | −6.6689 |
| S2 | aspheric | 1.7115 | 0.1093 | | | −7.0310 |
| S3 | aspheric | 1.9502 | 0.6588 | 1.55 | 56.1 | −6.2182 |
| S4 | aspheric | −14.7850 | 0.0400 | | | 12.6129 |
| S5 | aspheric | 13.2566 | 0.2400 | 1.67 | 20.4 | 93.2845 |
| S6 | aspheric | 3.3284 | 0.4166 | | | −11.5186 |
| S7 | aspheric | 5.8755 | 0.3250 | 1.65 | 23.5 | −99.0000 |
| S8 | aspheric | 5.7323 | 0.2328 | | | −96.7433 |
| S9 | aspheric | −73.8517 | 0.4881 | 1.55 | 56.1 | −99.0000 |
| S10 | aspheric | −3.6749 | 0.0400 | | | 2.9143 |
| S11 | aspheric | 4.1580 | 0.2693 | 1.65 | 23.5 | −61.3141 |
| S12 | aspheric | 6.7827 | 0.4474 | | | −86.6053 |
| S13 | aspheric | 1.3753 | 0.3382 | 1.55 | 56.1 | −8.3102 |
| S14 | aspheric | 0.8612 | 0.3302 | | | −4.1437 |
| S15 | spherical | infinite | 0.2205 | 1.52 | 64.2 | |
| S16 | spherical | infinite | 0.6039 | | | |
| S17 | spherical | infinite | | | | |

TABLE 23

| surface number | A4 | A6 | A8 | A10 | A12 |
|---|---|---|---|---|---|
| S1 | 4.5013E−02 | −6.3688E−02 | 2.5611E−02 | −4.1146E−03 | −1.4721E−04 |
| S2 | 3.1166E−02 | −1.3499E−01 | 1.0770E−01 | −2.9000E−02 | 6.3323E−05 |
| S3 | 5.4105E−02 | −5.7798E−02 | 7.8886E−03 | 5.7855E−02 | −5.2007E−02 |
| S4 | 5.6369E−02 | −1.5348E−01 | 1.4054E−01 | −8.3005E−02 | 3.4520E−02 |
| S5 | 2.2412E−02 | −9.7214E−02 | 8.1816E−02 | −3.3340E−02 | 7.8482E−03 |
| S6 | 2.5401E−02 | 1.3080E−02 | −5.2988E−02 | 2.0202E−01 | −3.9013E−01 |
| S7 | −3.1683E−02 | −3.8679E−02 | 3.4634E−02 | −4.0066E−02 | 2.8480E−02 |
| S8 | −9.8096E−02 | 1.3515E−01 | −2.7581E−01 | 3.0493E−01 | −2.3238E−01 |
| S9 | −2.6091E−01 | 5.4905E−01 | −7.3398E−01 | 5.7201E−01 | −2.5985E−01 |
| S10 | −2.6742E−01 | 4.4775E−01 | −5.0673E−01 | 3.6376E−04 | −1.5474E−01 |
| S11 | 3.1156E−01 | −4.5962E−01 | 3.6559E−01 | −2.5291E−01 | 1.4794E−01 |
| S12 | 3.8895E−01 | −5.1887E−01 | 3.3869E−01 | −1.3662E−01 | 3.4880E−02 |
| S13 | −2.3808E−01 | 5.3927E−02 | 7.5094E−03 | −5.3115E−03 | 1.0490E−03 |
| S14 | −1.6234E−01 | 6.4894E−02 | −1.7276E−02 | 2.9212E−03 | −3.0158E−04 |

| surface number | A14 | A16 | A18 | A20 |
|---|---|---|---|---|
| S1 | 1.4748E−04 | −2.0968E−05 | 1.2757E−06 | −2.9347E−08 |
| S2 | 1.4169E−03 | −2.6845E−04 | 1.8649E−05 | −3.7109E−07 |
| S3 | 1.9624E−02 | −3.7941E−03 | 3.7069E−04 | −1.4544E−05 |
| S4 | −9.5868E−03 | 1.6446E−03 | −1.5580E−04 | 6.2024E−06 |
| S5 | −1.1198E−03 | 9.5517E−05 | −4.4805E−06 | 8.8898E−08 |
| S6 | 4.2961E−01 | −2.6739E−01 | 8.7764E−02 | −1.1742E−02 |
| S7 | −1.0037E−02 | 1.8306E−03 | −1.6676E−04 | 5.9909E−06 |
| S8 | 1.2770E−01 | −4.7779E−02 | 1.0452E−02 | −9.7345E−04 |
| S9 | 6.8810E−02 | −1.0418E−02 | 8.3130E−04 | −2.6884E−05 |
| S10 | 3.9129E−02 | −5.7895E−03 | 4.6334E−04 | −1.5496E−05 |
| S11 | −6.1661E−02 | 1.5659E−02 | −2.1150E−03 | 1.1577E−04 |
| S12 | −5.5882E−03 | 5.4227E−04 | −2.9064E−05 | 6.5952E−07 |
| S13 | −1.0869E−04 | 6.3444E−06 | −1.9704E−07 | 2.5330E−09 |
| S14 | 1.8922E−05 | −7.0272E−07 | 1.4169E−08 | −1.1931E−10 |

TABLE 24

| parameter | f1 (mm) | f2 (mm) | f3 (mm) | f4 (mm) | f5 (mm) |
|---|---|---|---|---|---|
| numerical value | −82.18 | 3.20 | −6.72 | −3313.30 | 7.06 |

| parameter | f6 (mm) | f7 (mm) | f (mm) | TTL (mm) | ImgH (mm) |
|---|---|---|---|---|---|
| numerical value | 16.02 | −5.49 | 3.75 | 5.00 | 3.50 |

Figure 16A:
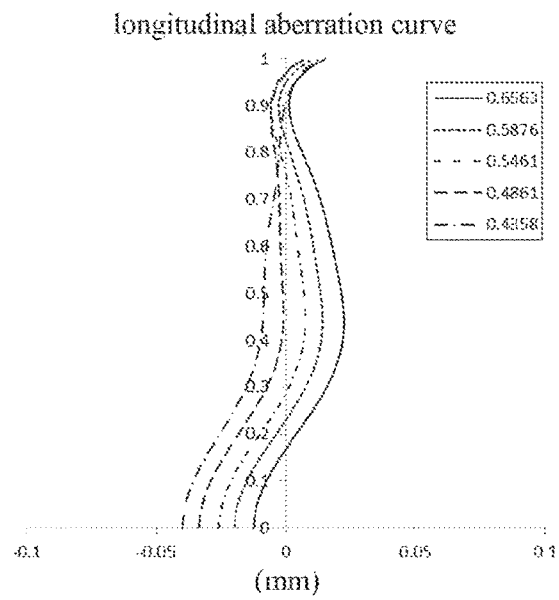
FIGS. 16A-16D respectively illustrate a longitudinal aberration curve, an astigmatic curve, a distortion curve, and a lateral color curve of the optical imaging lens assembly according to Embodiment 8.
Figure 16B:
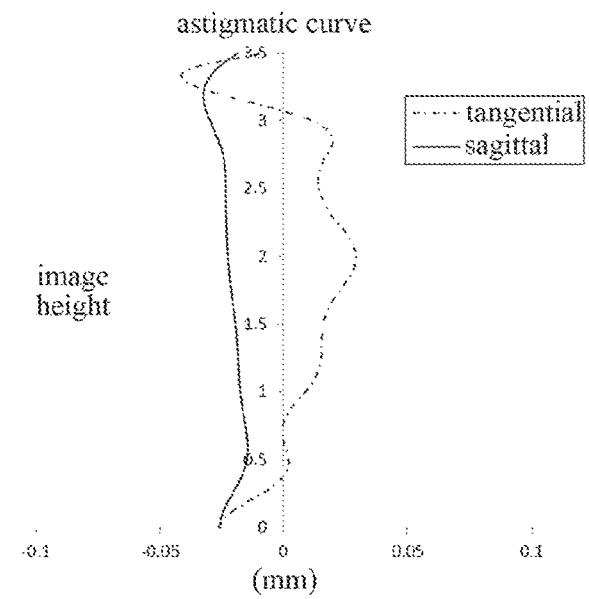
Figure 16C:
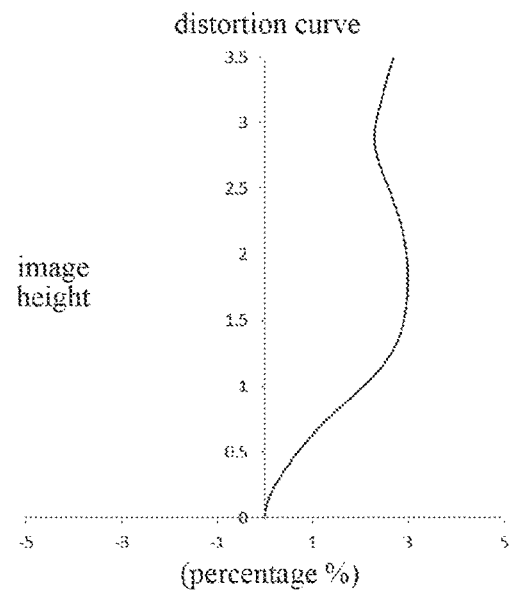
Figure 16D:
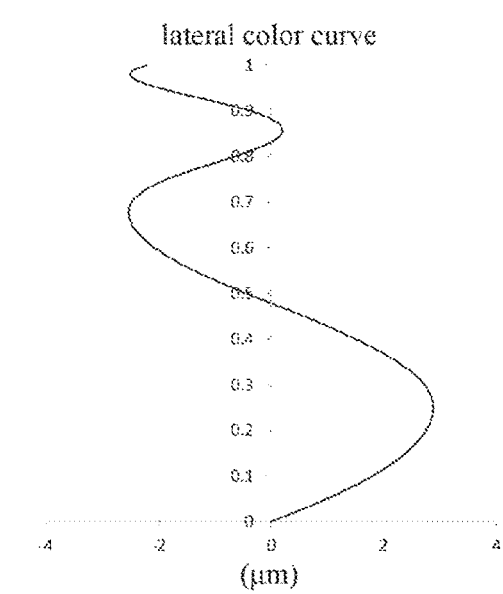

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing the curvature of the tangential image plane and the curvature of the sagittal image plane. FIG. 16C illustrates the distortion curve of the optical imaging lens assembly according to Embodiment 8, representing amounts of distortion at different viewing angles. FIG. 16C illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

Figure 17:
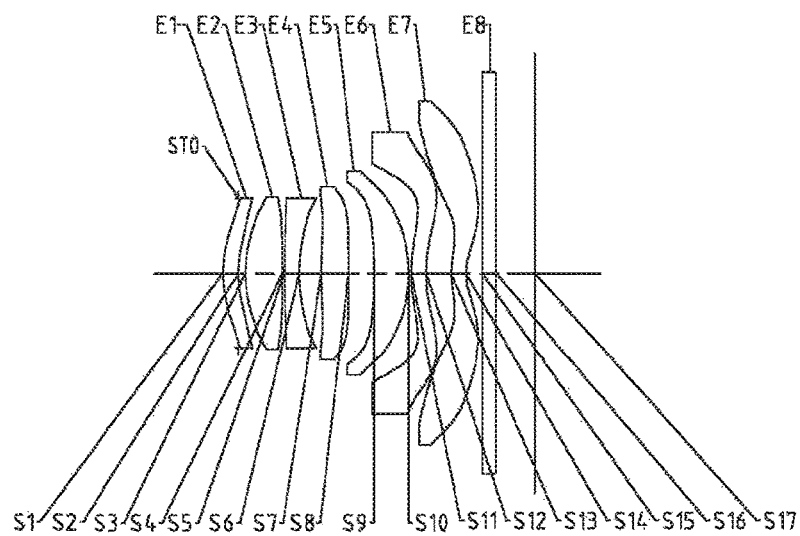
FIG. 17 is a schematic structural diagram illustrating an optical imaging lens assembly according to Embodiment 9 of the present disclosure.

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17. The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 or the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-316 and finally forms an image on the image plane S17.

Alternatively, a diaphragm STO for limiting light beams may be disposed between the object side and the first lens E1, to improve the image quality of the optical imaging lens assembly.

Table 25 shows the surface type, the radius of curvature, the thickness, the material and the conic coefficient of each lens of the optical imaging lens assembly in Embodiment 9. The units of the radius of curvature and the thickness are both millimeters (mm). Table 26 shows the high-order coefficients applicable to each aspheric surface in Embodiment 9. The surface type of each aspheric surface may be defined by the formula (1) given in Embodiment 1. Table 27 shows the effective focal lengths f1-f7 of the lenses of the optical imaging lens assembly in Embodiment 9, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2500 | | | |
| S1 | aspheric | 1.8774 | 0.2476 | 1.55 | 56.1 | −7.8217 |
| S2 | aspheric | 1.8808 | 0.1133 | | | −7.7865 |
| S3 | aspheric | 2.0682 | 0.5917 | 1.55 | 56.1 | −4.5772 |
| S4 | aspheric | −19.1747 | 0.0300 | | | 93.5488 |
| S5 | aspheric | 10.4617 | 0.2400 | 1.67 | 20.4 | 57.7835 |
| S6 | aspheric | 2.9322 | 0.3507 | | | −11.8311 |
| S7 | aspheric | 7.4076 | 0.4366 | 1.65 | 23.5 | 28.3841 |
| S8 | aspheric | 23.1980 | 0.4072 | | | 50.5630 |
| S9 | aspheric | −12.4677 | 0.5667 | 1.55 | 56.1 | 68.6854 |
| S10 | aspheric | −2.4428 | 0.0400 | | | −0.1224 |
| S11 | aspheric | 3.1732 | 0.2400 | 1.65 | 23.5 | −39.6148 |
| S12 | aspheric | 2.8952 | 0.3948 | | | −23.1823 |
| S13 | aspheric | 1.2534 | 0.2400 | 1.55 | 56.1 | −11.6756 |
| S14 | aspheric | 0.7744 | 0.2633 | | | −4.8144 |
| S15 | spherical | infinite | 0.2205 | 1.52 | 64.2 | |
| S16 | spherical | infinite | 0.6175 | | | |
| S17 | spherical | infinite | | | | |

TABLE 26

| surface number | A4 | A6 | A8 | A10 | A12 |
|---|---|---|---|---|---|
| S1 | 8.4469E−02 | −1.0041E−01 | 4.7595E−02 | −1.1874E−02 | 1.6830E−03 |
| S2 | 3.9959E−02 | −1.1500E−01 | 2.4701E−02 | 7.8002E−02 | −6.7788E−02 |
| S3 | 3.0330E−02 | −9.7040E−03 | −8.9713E−02 | 1.7228E−01 | −1.2470E−01 |
| S4 | 8.6057E−02 | −1.9225E−01 | 1.5850E−01 | −7.5910E−02 | 2.4100E−02 |
| S5 | 2.3913E−02 | −1.2474E−01 | 1.0673E−01 | −4.3169E−02 | 1.0024E−02 |
| S6 | 2.3818E−02 | 2.7536E−02 | −1.1709E−01 | 3.3065E−01 | 5.3789E−01 |
| S7 | −4.6639E−02 | −2.6625E−02 | 4.7862E−02 | −5.8314E−02 | 3.2605E−02 |
| S8 | −4.6338E−02 | −6.3351E−03 | 1.2735E−03 | −3.1164E−02 | 5.3415E−02 |
| S9 | −3.1677E−02 | 4.2822E−02 | −6.5431E−02 | 2.7783E−02 | −5.6550E−03 |
| S10 | −4.6963E−02 | 6.5879E−02 | −7.3263E−02 | 3.7923E−02 | −1.0484E−02 |
| S11 | 2.0378E−01 | −3.8895E−01 | 4.1463E−01 | −3.9107E−01 | 2.6438E−01 |
| S12 | 1.9121E−01 | −2.6153E−01 | 1.4831E−01 | −5.2227E−02 | 1.1813E−02 |
| S13 | −3.9612E−01 | 1.9227E−01 | −2.8603E−02 | −5.4661E−03 | 2.8607E−03 |
| S14 | −2.5640E−01 | 1.6084E−01 | −6.6860E−02 | 1.8667E−02 | −3.3742E−03 |

| surface number | A14 | A16 | A18 | A20 |
|---|---|---|---|---|
| S1 | −1.3802E−04 | 6.3043E−06 | −1.4050E−07 | 1.0079E−09 |
| S2 | 2.4694E−02 | −4.6696E−03 | 4.5026E−04 | −1.7525E−05 |
| S3 | 4.5437E−02 | −8.9282E−03 | 9.0558E−04 | −3.7279E−05 |
| S4 | −5.2269E−03 | 7.4620E−04 | −6.2642E−05 | 2.3129E−06 |
| S5 | −1.4120E−03 | 1.1936E−04 | −5.5736E−06 | 1.1055E−07 |
| S6 | 5.3176E−01 | −3.0867E−01 | 9.6879E−02 | −1.2625E−02 |
| S7 | −9.0239E−03 | 1.2872E−03 | −8.8186E−05 | 2.1386E−06 |
| S8 | −4.5121E−02 | 2.0236E−02 | −4.5246E−03 | 3.9741E−04 |
| S9 | 6.3943E−04 | −4.1282E−05 | 1.4285E−06 | −2.0600E−08 |
| S10 | 1.6867E−03 | −1.5926E−04 | 8.2079E−06 | −1.7843E−07 |
| S11 | −1.1603E−01 | 3.0632E−02 | −4.3498E−03 | 2.5338E−04 |
| S12 | −1.6700E−03 | 1.4110E−04 | −6.4918E−06 | 1.2496E−07 |
| S13 | −4.9061E−04 | 4.3207E−05 | −1.9581E−06 | 3.6189E−08 |
| S14 | 3.7910E−04 | −2.5209E−05 | 9.0250E−07 | −1.3357E−08 |

TABLE 27

| parameter | f1 (mm) | f2 (mm) | f3 (mm) | f4 (mm) | f5 (mm) |
|---|---|---|---|---|---|
| numerical value | 71.02 | 3.45 | −6.18 | 16.69 | 5.45 |

| parameter | f6 (mm) | f7 (mm) | f (mm) | TTL (mm) | ImgH (mm) |
|---|---|---|---|---|---|
| numerical value | −77.47 | −4.51 | 3.82 | 5.00 | 3.50 |

Figures 18A, 18B:
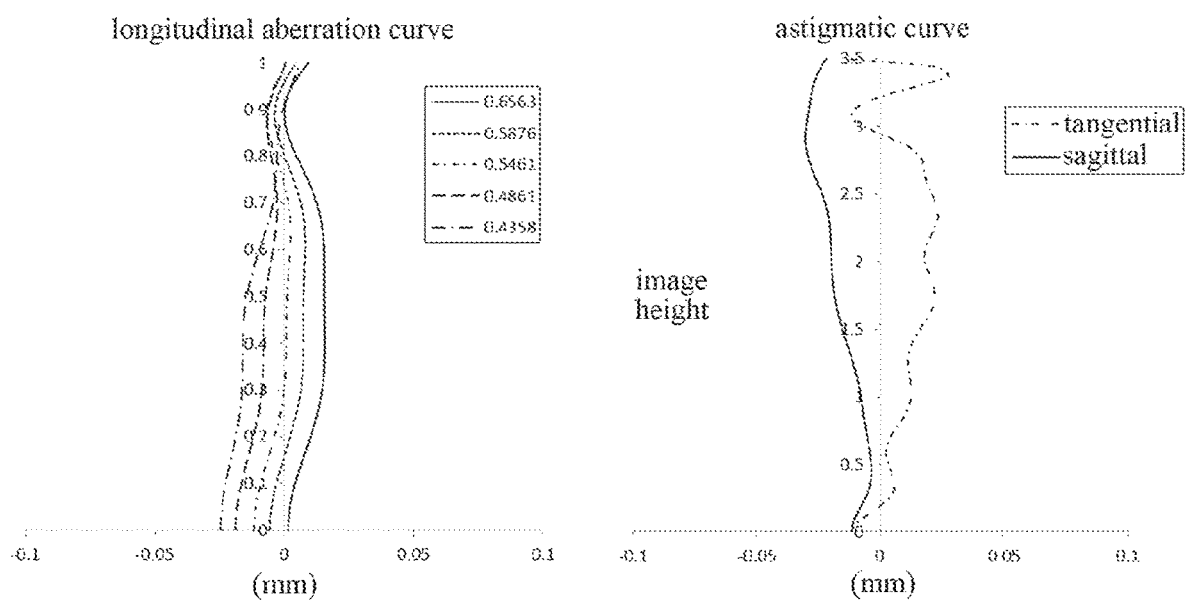
FIGS. 18A-18D respectively illustrate a longitudinal aberration curve, an astigmatic curve, a distortion curve, and a lateral color curve of the optical imaging lens assembly according to Embodiment 9.
Figures 18C, 18D:
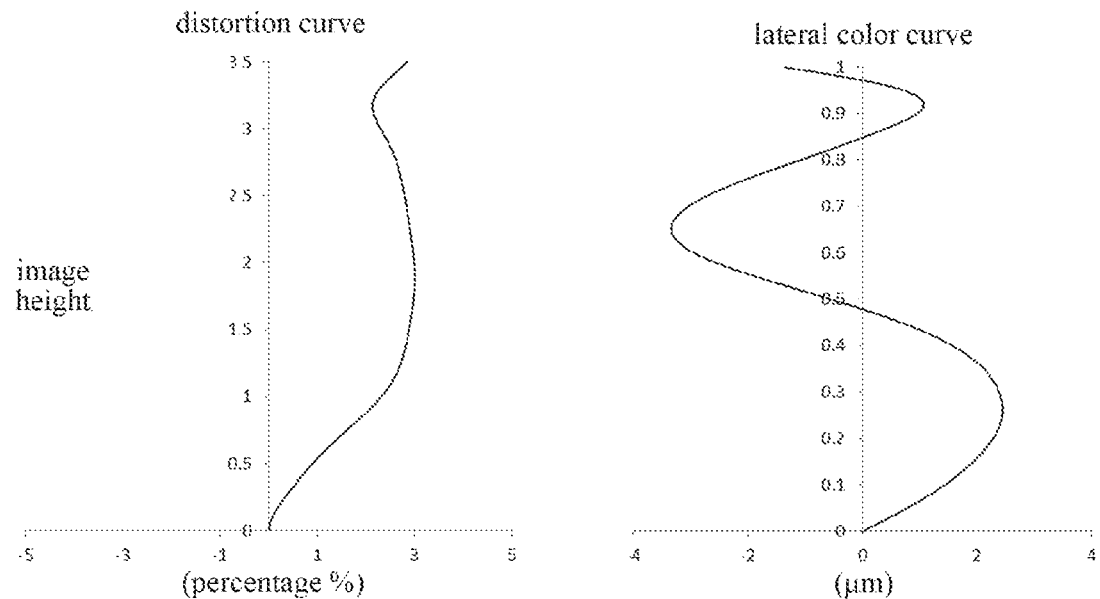

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing the curvature of the tangential image plane and the curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

Embodiment 10

Figure 19:
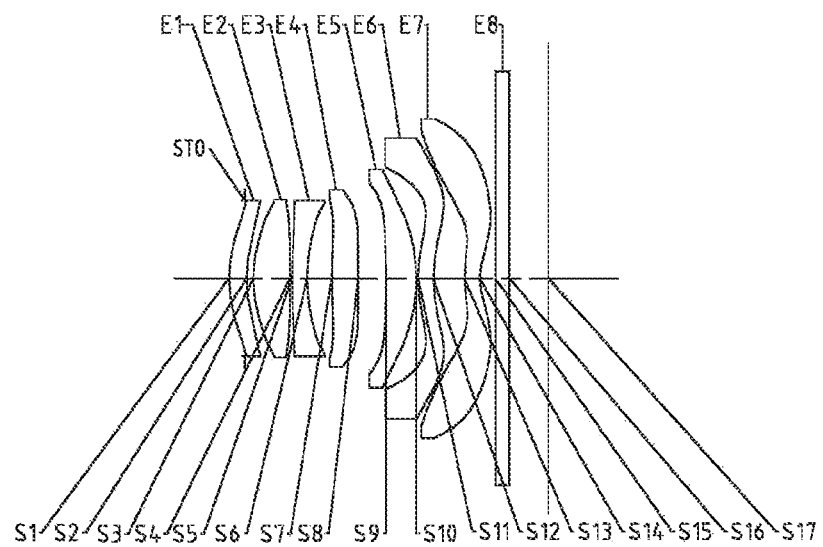
FIG. 19 is a schematic structural diagram illustrating an optical imaging lens assembly according to Embodiment 10 of the present disclosure.

An optical imaging lens assembly according to Embodiment 10 of the present disclosure is described below with reference to FIGS. 19-20D. FIG. 19 is a schematic structural diagram illustrating the optical imaging lens assembly according to Embodiment 10 of the present disclosure.

As shown in FIG. 19, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S17 The optical imaging lens assembly may further include a photosensitive element disposed on the image plane S17.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a positive refractive power, an object-side surface S3 of the second lens E2 is a convex surface, and an image-side surface S4 of the second lens E2 is a convex surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

The seventh lens E7 has a negative refractive power, an object-side surface S13 of the seventh lens E7 is a convex surface, and an image-side surface S14 of the seventh lens E7 is a concave surface. The object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, a diaphragm STO for limiting light beams may be disposed between the object side and the first lens E1, to improve the image quality of the optical imaging lens assembly.

Table 28 shows the surface type, the radius of curvature, the thickness, the material and the conic coefficient of each lens of the optical imaging lens assembly in Embodiment 10. The units of the radius of curvature and the thickness are both millimeters (mm). Table 29 shows the high-order coefficients applicable to each aspheric surface in Embodiment 10. The surface type of each aspheric surface may be defined by the formula (1) given in Embodiment 1. Table 30 shows the effective focal lengths f1-f7 of the lenses of the optical imaging lens assembly in Embodiment 10, the total effective focal length f of the optical imaging lens assembly, the total track length TTL of the optical imaging lens assembly, and the half of the diagonal length ImgH of the effective pixel area of the photosensitive element on the image plane S17 of the optical imaging lens assembly.

TABLE 28

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2491 | | | |
| S1 | aspheric | 1.9433 | 0.2753 | 1.55 | 56.1 | −8.8807 |
| S2 | aspheric | 1.9312 | 0.1059 | | | −7.8649 |
| S3 | aspheric | 2.0409 | 0.5738 | 1.55 | 56.1 | −4.6212 |
| S4 | aspheric | −20.2365 | 0.0300 | | | 98.5160 |
| S5 | aspheric | 10.1200 | 0.2400 | 1.67 | 20.4 | 53.6824 |
| S6 | aspheric | 2.9340 | 0.3831 | | | −11.1080 |
| S7 | aspheric | 7.8786 | 0.4174 | 1.65 | 23.5 | 30.4255 |
| S8 | aspheric | 24.3391 | 0.4369 | | | −79.1375 |
| S9 | aspheric | −11.7906 | 0.4683 | 1.55 | 56.1 | 50.5663 |
| S10 | aspheric | −3.1117 | 0.0300 | | | −0.2270 |
| S11 | aspheric | 2.1215 | 0.2400 | 1.65 | 23.5 | −21.0755 |
| S12 | aspheric | 2.1773 | 0.4855 | | | −19.0058 |
| S13 | aspheric | 1.3407 | 0.2400 | 1.55 | 56.1 | −15.6688 |
| S14 | aspheric | 0.8195 | 0.2467 | | | −6.0412 |
| S15 | spherical | infinite | 0.2205 | 1.52 | 64.2 | |
| S16 | spherical | infinite | 0.6067 | | | |
| S17 | spherical | infinite | | | | |

TABLE 29

| surface number | A4 | A6 | A8 | A10 | A12 |
|---|---|---|---|---|---|
| S1 | 8.6935E−02 | −9.8380E−02 | 4.5177E−02 | −1.0807E−02 | 1.4817E−03 |
| S2 | 1.7746E−02 | −8.4082E−02 | −6.3983E−03 | 1.0307E−01 | −8.1964E−02 |
| S3 | 1.8309E−02 | 5.5991E−03 | −1.1457E−01 | 2.0171E−01 | −1.4360E−01 |
| S4 | 8.9517E−02 | −1.7614E−01 | 1.2395E−01 | −4.0940E−02 | 4.0392E−03 |
| S5 | 3.3970E−02 | −1.1597E−01 | 8.6787E−02 | −3.1478E−01 | 6.6343E−03 |
| S6 | 2.8942E−02 | 2.6144E−02 | −1.1536E−01 | 3.2536E−01 | −5.3698E−01 |
| S7 | −5.0756E−02 | −2.4355E−02 | 4.8643E−02 | −5.8499E−02 | 3.1444E−02 |
| S8 | −4.8010E−02 | −1.8409E−02 | 3.2692E−02 | −7.5843E−02 | 9.4094E−02 |
| S9 | 1.6411E−02 | −2.2462E−03 | −1.9730E−02 | 8.0390E−03 | −1.3967E−03 |
| S10 | −9.3351E−02 | 1.8324E−01 | −2.1227E−01 | 1.4141E−01 | −5.5732E−02 |
| S11 | 1.0367E−01 | −2.0302E−01 | 1.4738E−01 | −1.0652E−01 | 5.8248E−02 |
| S12 | 1.2542E−01 | −1.9200E−01 | 1.0230E−01 | −3.3192E−02 | 7.2886E−03 |
| S13 | −4.0421E−01 | 1.9956E−01 | −3.3255E−02 | −5.4559E−03 | 3.5807E−03 |
| S14 | −2.2689E−01 | 1.2233E−01 | −4.0858E−02 | 8.8829E−03 | −1.2644E−03 |

| surface number | A14 | A16 | A18 | A20 |
|---|---|---|---|---|
| S1 | −1.2059E−04 | 5.7401E−06 | −1.4688E−07 | 1.5501E−09 |
| S2 | 2.9594E−02 | −5.6358E−03 | 5.4967E−04 | −2.1654E−05 |
| S3 | 5.2169E−02 | −1.0271E−02 | 1.0463E−03 | −4.3312E−05 |
| S4 | 1.3777E−03 | −4.8571E−04 | 5.8427E−05 | −2.5608E−06 |
| S5 | −8.5712E−04 | 6.7138E−05 | −2.9336E−06 | 5.4932E−08 |
| S6 | 5.3570E−01 | −3.1219E−01 | 9.8049E−02 | −1.2757E−02 |
| S7 | −8.2362E−03 | 1.0779E−03 | −6.2671E−05 | 9.4821E−07 |
| S8 | −6.9564E−02 | 2.9450E−02 | −6.4553E−03 | 5.6657E−04 |
| S9 | 1.3081E−04 | −6.9097E−06 | 1.9435E−07 | −2.2686E−09 |
| S10 | 1.3336E−02 | −1.8987E−03 | 1.4762E−04 | −4.8161E−06 |
| S11 | −1.9915E−02 | 3.9445E−03 | −4.1239E−04 | 1.7577E−05 |
| S12 | −1.0671E−03 | 9.7406E−05 | −4.9406E−06 | 1.0566E−07 |
| S13 | −7.2018E−04 | 7.4329E−05 | −3.9450E−06 | 8.5153E−08 |
| S14 | 1.1201E−04 | −5.8498E−06 | 1.6393E−07 | −1.8961E−09 |

TABLE 30

| parameter | f1 (mm) | f2 (mm) | f3 (mm) | f4 (mm) | f5 (mm) |
|---|---|---|---|---|---|
| numerical value | 80.65 | 3.42 | −6.27 | 17.88 | 7.59 |

| parameter | f6 (mm) | f7 (mm) | f (mm) | TTL (mm) | ImgH (mm) |
|---|---|---|---|---|---|
| numerical value | 47.76 | −4.61 | 3.88 | 5.00 | 3.65 |

Figure 20A:
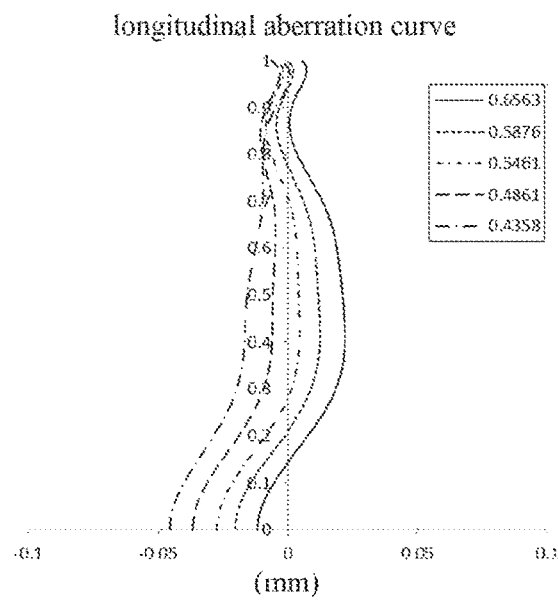
FIGS. 20A-20D respectively illustrate a longitudinal aberration curve, an astigmatic curve, a distortion curve, and a lateral color curve of the optical imaging lens assembly according to Embodiment 10.
Figure 20B:
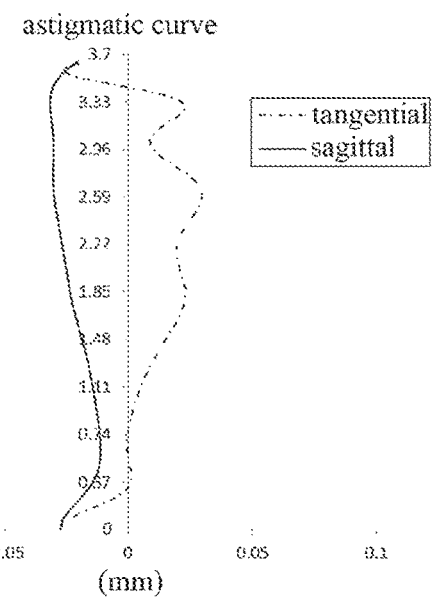
Figure 20C:
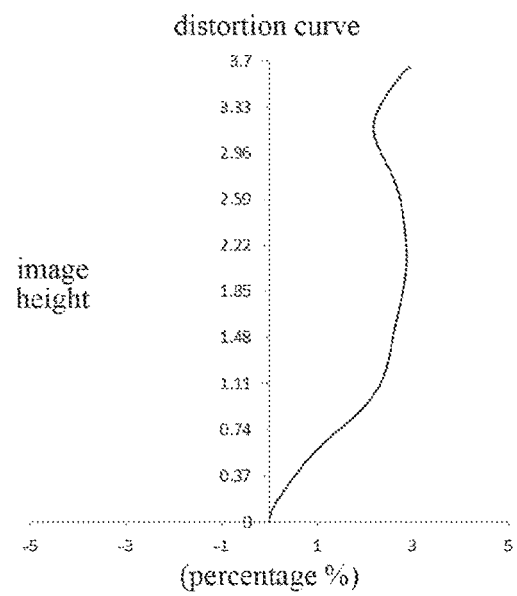
Figure 20D:
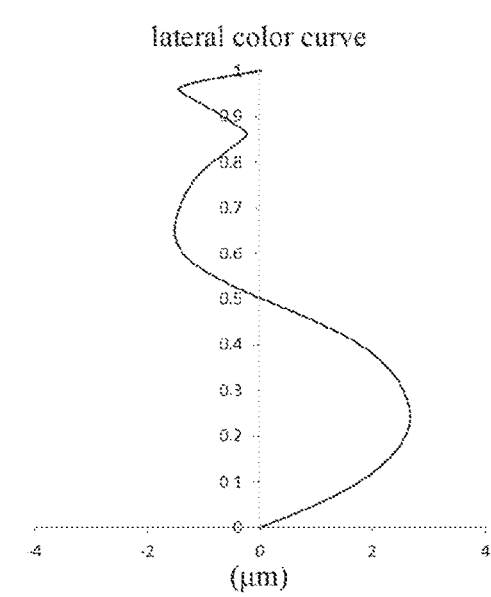

FIG. 20A illustrates the longitudinal aberration curve of the optical imaging lens assembly according to Embodiment 10, representing deviations of focal points of light of different wavelengths converged after passing through the lens assembly. FIG. 20B illustrates the astigmatic curve of the optical imaging lens assembly according to Embodiment 10, representing the curvature of the tangential image plane and the curvature of the sagittal image plane. FIG. 20C illustrates the distortion curve of the optical imaging lens assembly according to Embodiment 10, representing amounts of distortion at different viewing angles. FIG. 20D illustrates the lateral color curve of the optical imaging lens assembly according to Embodiment 10, representing deviations of different image heights on the image plane after light passes through the lens assembly. It can be seen from FIGS. 20A-20D that the optical imaging lens assembly according to Embodiment 10 can achieve a good imaging quality.

To sum up, Embodiments 1-10 respectively satisfy the relationships shown in Table 31 below.

TABLE 31

| ConditionalExpression | Embodiment | | | | | | | | | |
| | 1 | 2 | 3 | 4 | 5 | 6 | 7 | 8 | 9 | 10 |
|---|---|---|---|---|---|---|---|---|---|---|
| f2/\|f1\| | 0.31 | 0.10 | 0.18 | 0.10 | 0.33 | 0.39 | 0.10 | 0.04 | 0.05 | 0.04 |
| \|(R9 − R12)/(R9 + R12)\| | 0.07 | 0.13 | 0.31 | 0.13 | 0.75 | 0.16 | 0.13 | 1.20 | 1.60 | 1.45 |
| (CT4 + CT5 + CT6)/3 | 0.30 | 0.37 | 0.37 | 0.39 | 0.45 | 0.40 | 0.39 | 0.36 | 0.41 | 0.38 |
| f/\|f4\| | 0.02 | 0.01 | 0.02 | 0.01 | 0.03 | 0.02 | 0.01 | 0.001 | 0.23 | 0.22 |
| \|f/f5\| + \|f/f6\| | 0.44 | 0.59 | 0.57 | 0.60 | 0.92 | 0.80 | 0.58 | 0.76 | 0.75 | 0.59 |
| ET4/CT4 | 0.81 | 0.71 | 0.69 | 0.71 | 0.67 | 0.67 | 0.71 | 0.47 | 0.51 | 0.48 |
| R2/R3 | 0.92 | 0.92 | 0.89 | 0.92 | 0.94 | 0.94 | 0.92 | 0.88 | 0.91 | 0.95 |
| R3/R4 | −0.35 | −0.14 | −0.18 | −0.14 | −0.21 | −0.21 | −0.14 | −0.13 | −0.11 | −0.10 |
| R6/R5 | 0.22 | 0.33 | 0.32 | 0.33 | 0.30 | 0.30 | 0.33 | 0.25 | 0.28 | 0.29 |
| f/f3 | −0.82 | −0.55 | −0.56 | −0.55 | −0.61 | −0.58 | −0.54 | −0.56 | −0.62 | −0.62 |
| f/\|f7\| | 0.47 | 0.03 | 0.03 | 0.03 | 0.78 | 0.30 | 0.01 | 0.68 | 0.85 | 0.84 |
| R7/R8 | 1.08 | 0.99 | 1.10 | 1.04 | 0.80 | 0.92 | 0.99 | 1.02 | 0.32 | 0.32 |
| TTL/ImgH | 1.84 | 1.54 | 1.47 | 1.49 | 1.58 | 1.73 | 1.49 | 1.43 | 1.43 | 1.37 |

The present disclosure further provides an imaging device, having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, sequentially along an optical axis from an object side to an image side, a first lens, a second lens, a third lens, a fourth lens, a fifth lens, a sixth lens, and a seventh lens,
    wherein each of the first lens, the fourth lens, and the fifth lens has a positive refractive power or a negative refractive power;
    the second lens has a positive refractive power;
    the third lens has a negative refractive power;
    at least one of the sixth lens or the seventh lens has a negative refractive power; and
    an effective focal length f1 of the first lens and an effective focal length f2 of the second lens satisfy: f2/|f1|<0.5,
    wherein an object-side surface of the first lens is a convex surface, an image-side surface of the fourth lens is a concave surface, and an image-side surface of the sixth lens is a concave surface.

2. The optical imaging lens assembly according to claim 1, wherein a total effective focal length f of the optical imaging lens assembly and an effective focal length f3 of the third lens satisfy: $-1.0 < f/f3 \leq -0.5$.

3. The optical imaging lens assembly according to claim 1, wherein a total effective focal length f of the optical imaging lens assembly, an effective focal length f5 of the fifth lens, and an effective focal length f6 of the sixth lens satisfy: $0.4 \leq |f/f5| + |f/f6| \leq 1.0$.

4. The optical imaging lens assembly according to claim 1, wherein a total effective focal length f of the optical imaging lens assembly and an effective focal length f7 of the seventh lens satisfy: f/|f7|<1.0.

5. The optical imaging lens assembly according to claim 1, wherein an edge thickness ET4 of the fourth lens at a maximum radius and a center thickness CT4 of the fourth lens on the optical axis satisfy: 0.4<ET4/CT4<1.0.

6. The optical imaging lens assembly according to claim 1, wherein a radius of curvature R7 of an object-side surface of the fourth lens and a radius of curvature R8 of the image-side surface of the fourth lens satisfy: 0<R7/R8<1.5.

7. An optical imaging lens assembly comprising, sequentially along an optical axis from an object side to an image side, a first lens, a second lens, a third lens, a fourth lens, a fifth lens, a sixth lens, and a seventh lens,
    wherein at least one of the first lens, the fourth lens, or the fifth lens has a positive refractive power;
    the second lens has a positive refractive power;
    the third lens has a negative refractive power;
    the sixth lens has a positive refractive power or a negative refractive power; and
    a center thickness CT4 of the fourth lens on the optical axis, a center thickness CT5 of the fifth lens on the optical axis and a center thickness CT6 of the sixth lens on the optical axis satisfy: $(CT4+CT5+CT6)/3 \leq 0.5$,
    wherein the optical imaging lens assembly has and only has seven lenses having refractive power,
    wherein the seventh lens has a positive refractive power or a negative refractive power, and an effective focal length f7 of the seventh lens and a total effective focal length f of the optical imaging lens assembly satisfy: f/|f7|<1.0.

8. The optical imaging lens assembly according to claim 7, satisfying: TTL/ImgH≤1.85,
    wherein TTL is a distance on the optical axis from an object-side surface of the first lens to an image plane of the optical imaging lens assembly, and
    ImgH is half of a diagonal length of an effective pixel area of a photosensitive element on the image plane of the optical imaging lens assembly.

9. The optical imaging lens assembly according to claim 7, wherein a total effective focal length f of the optical imaging lens assembly and an effective focal length f3 of the third lens satisfy: $-1.0 < f/f3 \leq -0.5$.

10. The optical imaging lens assembly according to claim 7, wherein a total effective focal length f of the optical imaging lens assembly and an effective focal length f4 of the fourth lens satisfy: f/|f4|≤0.5.

11. The optical imaging lens assembly according to claim 10, wherein an image-side surface of the fourth lens is a concave surface, and
    a radius of curvature R7 of an object-side surface of the fourth lens and a radius of curvature R8 of the image-side surface of the fourth lens satisfy: 0<R7/R8<1.5.

12. The optical imaging lens assembly according to claim 11, wherein an edge thickness ET4 of the fourth lens at a maximum radius and a center thickness CT4 of the fourth lens on the optical axis satisfy: 0.4<ET4/CT4<1.0.

13. An optical imaging lens assembly comprising, sequentially along an optical axis from an object side to an image side, a first lens, a second lens, a third lens, a fourth lens, a fifth lens, a sixth lens, and a seventh lens,
    wherein an object-side surface of the first lens is a convex surface;
    a radius of curvature R3 of an object-side surface of the second lens and a radius of curvature R4 of an image-side surface of the second lens satisfy:

$-0.5 \leq R3/R4 \leq 0$;

a radius of curvature R5 of an object-side surface of the third lens and a radius of curvature R6 of an image-side surface of the third lens satisfy: 0<R6/R5<0.5;
    an image-side surface of the fourth lens and an image-side surface of the six lens are concave surfaces;
    at least one of an object-side surface or an image-side surface of the fifth lens is a convex surface; and
    at least one of an object-side surface or an image-side surface of the seventh lens is a concave surface.

14. The optical imaging lens assembly according to claim 13, wherein a radius of curvature R7 of an object-side surface of the fourth lens and a radius of curvature R8 of the image-side surface of the fourth lens satisfy: 0<R7/R8<1.5.

15. The optical imaging lens assembly according to claim 13, wherein a radius of curvature R9 of the object-side surface of the fifth lens and a radius of curvature R12 of the image-side surface of the sixth lens satisfy: $|(R9-R12)/(R9+R12)|\leq 2.0$.

16. The optical imaging lens assembly according to claim 13, wherein a total effective focal length f of the optical imaging lens assembly and an effective focal length f4 of the fourth lens satisfy: $f/|f4|\leq 0.5$.

17. The optical imaging lens assembly according to claim 13, wherein a total effective focal length f of the optical imaging lens assembly and an effective focal length f7 of the seventh lens satisfy: $f/|f7|<1.0$.

18. The optical imaging lens assembly according to claim 13, satisfying: $(CT4+CT5+CT6)/3\leq 0.5$, wherein CT4 is a center thickness of the fourth lens on the optical axis;

CT5 is a center thickness of the fifth lens on the optical axis; and

CT6 is a center thickness of the sixth lens on the optical axis.

\* \* \* \* \*